United States Patent [19]
Morikawa

[11] Patent Number: 5,854,957
[45] Date of Patent: Dec. 29, 1998

[54] IMAGE FORMATION APPARATUS THAT CAN HAVE WAITING TIME BEFORE IMAGE FORMATION REDUCED

[75] Inventor: Takeshi Morikawa, Toyokawa, Japan

[73] Assignee: Minolta Co., Ltd., Osaka, Japan

[21] Appl. No.: 858,148

[22] Filed: May 19, 1997

[30] Foreign Application Priority Data

May 22, 1996 [JP] Japan .................................. 8-151623

[51] Int. Cl.⁶ .................................................. G03G 15/00
[52] U.S. Cl. ............................... 399/38; 399/70; 399/408
[58] Field of Search .................................. 399/67, 68, 69, 399/70, 38, 75, 76, 77, 194, 320, 322, 328, 330, 335, 400, 408; 358/448, 450

[56] References Cited

U.S. PATENT DOCUMENTS

| | | | |
|---|---|---|---|
| 4,812,877 | 3/1989 | Nishimori et al. | 399/82 |
| 5,063,459 | 11/1991 | Nakatani et al. | 358/404 |
| 5,109,255 | 4/1992 | Nishikawa et al. | 399/70 |
| 5,280,328 | 1/1994 | Goto et al. | 399/70 |
| 5,288,192 | 2/1994 | Ito et al. | 412/13 |
| 5,309,245 | 5/1994 | Hayashi et al. | 358/296 |
| 5,319,428 | 6/1994 | Maruko et al. | 399/70 |
| 5,489,935 | 2/1996 | Dornier | 347/211 |
| 5,694,226 | 12/1997 | Yokoyama | 399/70 X |

FOREIGN PATENT DOCUMENTS 62-187874  8/1987  Japan.
3-288867  12/1991  Japan.

Primary Examiner—Sandra L. Brase
Attorney, Agent, or Firm—McDermott, Will & Emery

[57] ABSTRACT

In an image formation apparatus, the control temperature of a heat fixing device includes an operation temperature and a standby temperature that is relatively lower than the operation temperature. When an instruction is designated to start an image formation operation, data associated with the start timing of the first image formation operation is calculated. Control of raising the temperature of a roller for heat fixing from the standby temperature to the operation temperature is initiated so that the heat fixing roller attains the operation temperature at the start timing of an image formation operation. As a result, the time of initiating control to raise the temperature to the operation temperature level is optimized to reduce power consumption without increasing the standby time for an image formation operation.

57 Claims, 20 Drawing Sheets

| REGION | PAGE NUMBER PN | PRE-CONCATENATION | POST-CONCATENATION | ADDITIONAL INFORMATION |
|---|---|---|---|---|
| 01 | 1 | 00 | 02 | |
| 02 | 1 | 01 | FF | |
| 03 | 2 | 00 | 04 | |
| 04 | 2 | 03 | FF | |
| ⋮ | | | | |

MT1

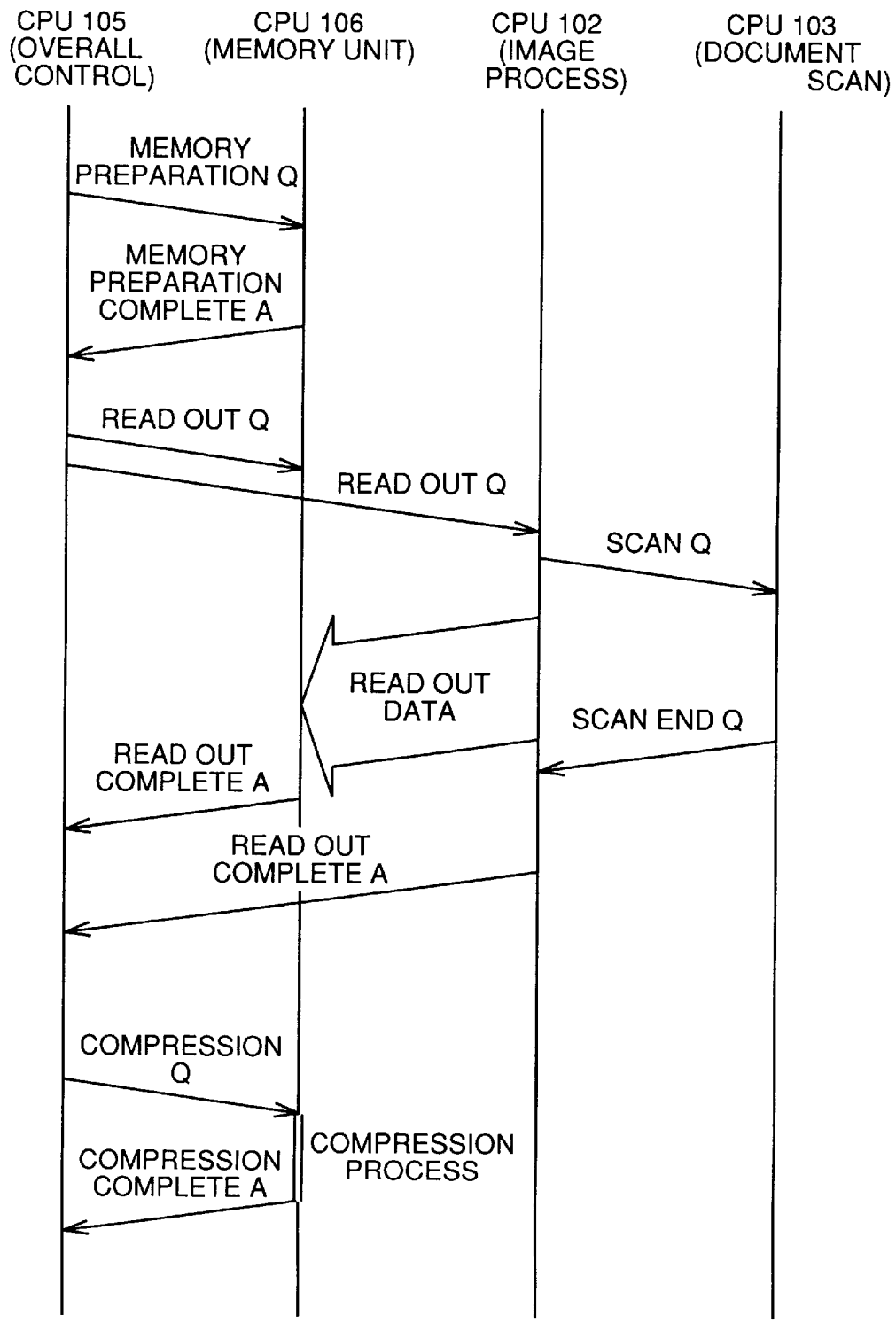

IMAGE FORMATION APPARATUS THAT CAN HAVE WAITING TIME BEFORE IMAGE FORMATION REDUCED

BACKGROUND OF THE INVENTION

1. Field of the Invention

The present invention relates to an image formation apparatus that forms an image on a sheet according to image data. More particularly, the present invention relates to an image formation apparatus having a standby mode and an operation mode.

2. Description of the Related Art

A digital copy machine that has power consumption reduced is provided by controlling a heat fixing roller to attain a standby temperature of a relative low temperature in a standby mode, and to attain an operation temperature that allows a heat fixing operation in an operation mode. In such a copy machine, the mode is switched from a standby mode to an operation mode when a copy operation command is issued. However, the readout operation of the original image is inhibited until warm-up is completed. Only an original document set operation is allowed by an automatic document feeder during warm-up. Switching from a standby mode to an operation mode is also effected when the document cover is opened or when an arbitrary key operation is detected.

Japanese Patent Laying-Open No. 62-187874 discloses a printer of an electrophotographic system reduced in power consumption. The heat source for fixing is de-energized when the communication channel between a data supplier and a printer is closed. When the communication channel is opened, the heat source for fixing is immediately energized.

Japanese Patent Laying-Open No. 2-223271 discloses a facsimile of an electrophotographic system for reducing power consumption. In a standby mode, the heat fixing device of the electrophotographic system is switched to a relatively low temperature. In an operation mode, the fixing device is switched to a relatively high temperature of a level that allows a fixing operation.

Japanese Patent Laying-Open No. 3-288867 discloses a laser printer that controls the temperature of the heat fixing device. A first set temperature and a second set temperature higher than the first set temperature are provided as the control temperature of the heat fixing device. When a signal indicating that record data is ready to be transferred is transmitted from an external source, control is provided so that the heat fixing device arrives at the second set temperature of the level where a heat fixing operation is allowed at the time of initiating rotation of a polygon motor.

In a copy machine that inhibits a readout operation of an original image until warm-up is completed and that allows only a document setting operation, the original image readout operation and the image formation operation of reproducing the readout image on a sheet are carried out after warm-up is completed. There may be a long period from the time warm-up is completed until the time an image formation operation is initiated. In this case, power will be consumed wastefully.

For example, in a 2-in-1 copy mode in which two document images are combined and copied on a sheet, the image formation operation onto a sheet cannot be carried out until readout of the two documents ends. Similarly in a 4-in-1 copy mode in which four document images are combined and copied on one sheet, the image formation operation on a sheet cannot be carried out until readout of the four documents ends. In the case where the total number of documents is not definite when reading is carried out starting from the final document in a 2-in-1 copy mode or a 4-in-1 copy mode, it is desirable that the image formation operation onto a sheet is not initiated until all the document images are read out to determine the total number of documents. In this case, a long time period will elapse from the time the warm-up is completed to the time the image formation operation is commenced. The reason why it is desirable not to begin an image formation operation until the total number of documents is ascertained in a 2-in-1 copy mode is due to the fact that, if the image formation operation is initiated before the total number of documents is ascertained, there is a possibility that the image of the first page of the document is formed at a section not at the beginning of the sheet.

This elapse of a long time period from warm-up completion to image formation operation initiation is similarly encountered in the case where copied sheets are bound in the magazine-binding manner. This magazine-binding implies the binding manner in which a plurality of sheets having respective images formed on both the left and right pages of a spread out sheet are stacked and bound at the center line of the sheets. In this binding mode, the order of each image provided on the left and right pages of each sheet differs from the readout order of the original images. The image formation operation cannot be executed until read out of all the document images is completed.

Folded-binding and magazine binding will be described hereinafter with reference to FIGS. 20 and 21.

FIG. 20 is a diagram for describing folded-binding mode. The first page of a document is output on the left half portion of a sheet, and the second page of a document is output on the right half portion of the same sheet. Next, the third page of a document is output on the left half portion of the next sheet, and the fourth page of a document is output on the right half portion of that sheet. In a similar manner, all the documents are output up to the last page (N). Each sheet having an image printed is folded at the center line so that the print surface is exposed, i.e. faces outside. A plurality of the folded sheet are stacked and bound at the end opposite to the folded end to result in collated book binding (when the total number of pages is even).

FIG. 21 is a diagram for describing a magazine-binding mode. The first document page is output on the back side at the left half portion of a sheet. The second document page is output on the front side of that left half portion of the sheet. The last document page (N) is output on the back side of the right half portion of that same sheet. The next to last document page is output on the front side of that right half portion of the sheet. Next, the third document page is output on the back side of the left half portion of the next sheet. The fourth document page is output on the front side of that left half portion of the same next sheet. The last but second document page is output on the back side of the right half portion of that next page. The last but third document page is output on the front side of that right half portion of the same next sheet. Similarly, all the remaining pages of the documents are output. The plurality of sheets having respective images printed in this manner are stacked in order. The stacked sheets are folded at the center line and bound at that folded portion. Thus, collated book binding is implemented (when the total number of pages is a multiple of 4).

SUMMARY OF THE INVENTION

An object of the present invention is to optimize the time of switching from a standby temperature to an operation temperature in an image formation apparatus in which a member to be heated is maintained at an operation temperature and at a standby temperature lower than the operation temperature.

Another object of the present invention is to reduce waiting time before an image formation operation is commenced in an image formation apparatus employing a member to be heated that is held at an operation temperature and at a standby temperature lower than the operation temperature.

A further object of the present invention is to further reduce power consumption in an image formation apparatus employing a member to be heated that is maintained at an operation temperature and at a standby temperature lower than the operation temperature.

Still another object of the present invention is to optimize the switching time of a member to be heated from standby temperature to an operation temperature in an image formation method employing the member to be heated that is held at an operation temperature and at the standby temperature lower than the operation temperature.

The above objects of the present invention can be achieved by an image formation apparatus including elements set forth in the following.

According to an aspect of the present invention, an image formation apparatus includes a designation unit for providing designation to carry out an image formation operation, a reader for initiating a readout operation of a document according to designation of the designation unit, a memory for storing image data output from the reader, an image forming unit for carrying out an image formation operation according to the image data stored in the memory, a calculator for calculating the start timing of the first image formation operation in response to designation of the designation unit, a member to be heated that operates at a predetermined temperature, a switcher for switching between a standby mode in which the member to be heated is maintained at a standby temperature that is lower than the predetermined temperature and an operation mode in which the member to be heated is maintained at the predetermined temperature, and a controller for controlling the switching timing of the switcher so that the member to be heated arrives at the predetermined temperature at the start timing of the image formation operation.

Since the switching timing is controlled so that the member to be heated arrives at a predetermined temperature for initiating the image formation operation at the start timing of an image formation operation in the image formation apparatus of the present invention, the member to be heated is maintained at the predetermined operation temperature when an image formation operation is initiated. As a result, the member to be heated that is maintained at an operation temperature and a standby temperature lower than the operation temperature can have the switching time from the standby temperature to the operation temperature optimized.

According to another aspect of the present invention, an image formation method includes the step of providing designation to carry out an image formation operation, the step of initiating a readout operation of a document according to the designation, the step of storing image data that is output by the readout, the step of carrying out an image formation operation according to the stored image data, the step of calculating the start timing of the first image formation operation in response to the designation, the step of switching between a standby node in which the member to be heated is maintained at a standby temperature lower than the predetermined temperature and an operation mode in which the member to be heated is maintained at the predetermined temperature, and the step of controlling the switching timing so that the member to be heated arrives at the predetermined temperature at the start timing of an image formation operation.

According to the above image formation method, the switching timing between a standby mode in which the member to be heated is maintained at the standby temperature and an operation mode in which the member to be heated is maintained at the predetermined temperature is controlled so that the member to be heated arrives at the predetermined temperature of a level where the member to be heated initiates its operation at the start timing of an image formation operation. Therefore, the member to be heated is maintained at the predetermined temperature when the image formation operation is initiated. Thus, an image formation method is provided that can optimize the switching timing of the member to be heated from the standby temperature to the operation temperature.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows an image write operation sequence of the copy machine by transmission/reception of a request command an report between each CPU.

DESCRIPTION OF THE PREFERRED EMBODIMENTS

The apparatus of the present invention will be described hereinafter according to a specific embodiment.

1. Mechanism and Operation of a Copy Machine

Figure 1:
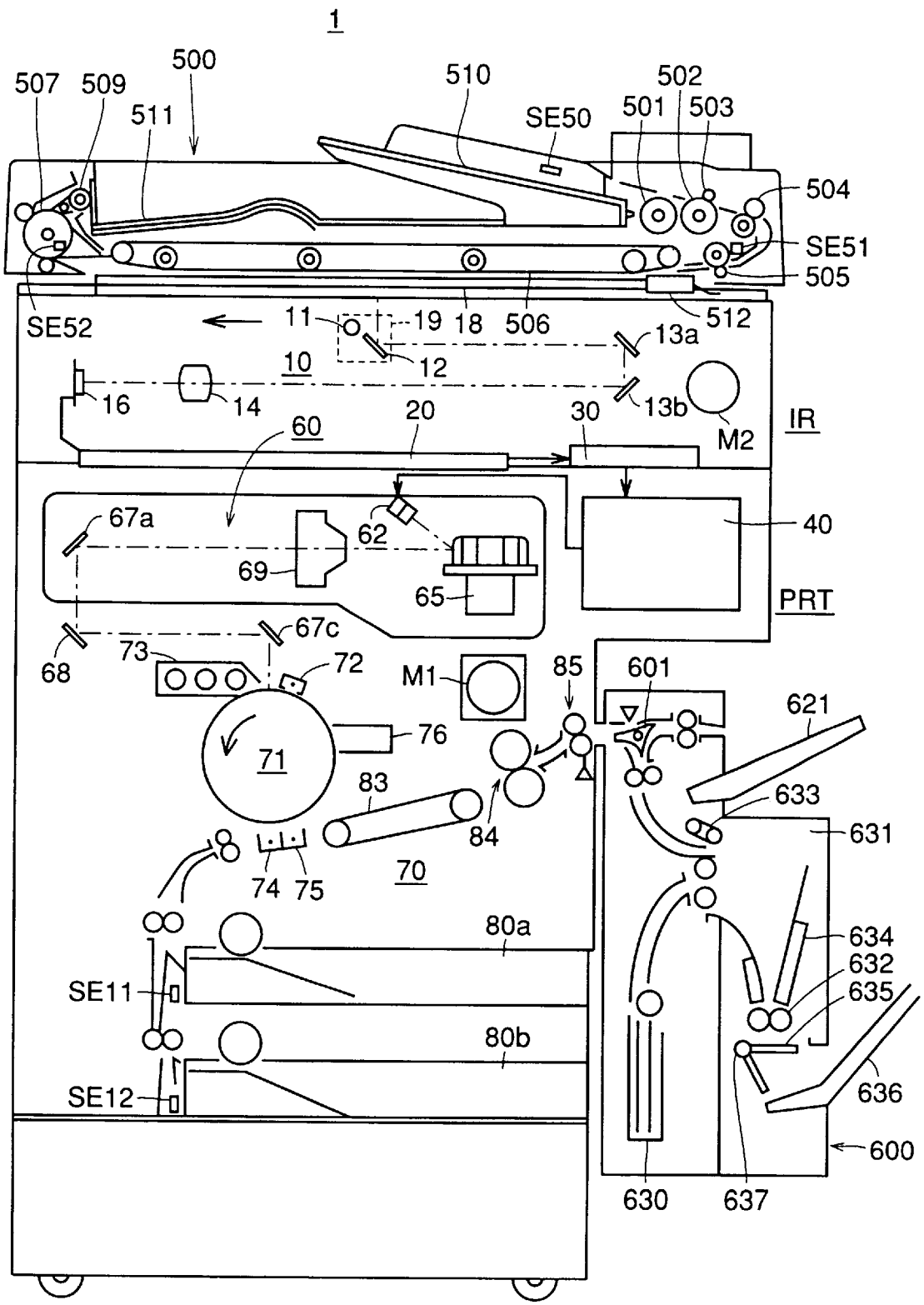
FIG. 1 is a schematic diagram of a mechanism of a copy machine according to an embodiment of the present invention.

Referring to FIG. 1, a copy machine 1 includes a document reader IR, and a printer unit PRT.

Document reader IR includes a document scanner 10, an image signal processing unit 20 for processing an image signal output from document scanner 10, and a memory unit 30 for storing image data generated by the process of image signal processing unit 20.

In document reader IR, a document on a glass platen 18 is exposed and scanned by a first mobile unit 19 incorporating an exposure lamp 11 and a first mirror 12. Reflected light is guided to a CCD line image sensor 16 via second mirrors 13a, 13b and a lens system 14 for imaging. An image signal that is photoelectrically converted by CCD line image sensor 16 is provided to image processing circuit 20, whereby image data is generated. The image data is stored in a memory in memory unit 30. The travel of first mobile unit 19 for scanning is effected by a scan motor M2.

Printer unit PRT includes a print processing unit 40 for generating an image record signal according to image data read out from memory unit 30, a print head unit 60 for writing an electrostatic latent image on a surface of a photoconductor drum 71 with a laser beam output from a laser diode 62 driven according to an image record signal output from print processing unit 40 and an image forming unit 70 for applying toner development on the electrostatic latent image formed at the surface of photoconductor drum 71 by print head unit 60 and fixing the image transferred on the sheet, and discharging the sheet outside the machine.

Printer PRT carries out the operation of writing an electrostatic latent image corresponding to an image record signal on photoconductor drum 71, the operation of developing the electrostatic latent image with toner, the operation of transferring the developed toner image on a sheet, the operation of fixing the toner image on the sheet, and the operation of feeding the sheet to a transfer position and conveying the sheet having a toner image transferred to a fixing position, and discharging the sheet after fixing.

In the operation of forming an electrostatic latent image on the surface of photoconductor drum 71, the image data read out from memory circuit 30 is converted into an image record signal for laser driving at print processing unit 40. A laser beam is output corresponding to an image by driving laser diode 62 according to the image record signal. This laser beam is directed to the charge surface of photoconductor drum 71 that is rotatably driven via polygon mirror 65, and optical systems 69, 67a, 68, 67b for imaging. The surface of photoconductor drum 71 is charged uniformly by a corona charger 72 at a position upstream of the laser beam incident position.

By attaching the toner in a developing device 73 to the electrostatic latent image formed at the surface of the rotated photoconductor drum 71, a toner image of the electrostatic latent image is developed. The operation of transferring the toner image at the surface of photoconductor drum 71 onto a sheet is effected by attracting the toner image by a transfer charger 74 and transferring the toner image onto the sheet that is provided at the transfer position. The operation of fixing the toner image transferred on the sheet is effected as set forth in the following. The sheet on which a toner image is transferred is detached from photoconductor drum 71 by a separation charger 75. Then, the sheet is carried to a fixing device 84 by a transport belt 83. Fixing device 84 applies an image fixing process by thermal compression bonding. The toner remaining on photoconductor drum 71 after the toner image is transferred is removed by a cleaner 76 provided at the downstream side. Photoconductor drum 71 is rotated at a constant rate by a main motor M1.

The operation of conveying a sheet is set forth in the following. An unloosen sheet from a selected one of sheet trays 80a and 80b travels through a transportation path to be feed at a transfer position between photoconductor drum 71 and transfer charger 74. After the transfer, the sheet is carried to fixing device 84 by transport belt 83. After the fixing operation, the sheet is discharged outside the machine by a pair of discharge rollers 85. The size of the sheet in sheet trays 80a and 80b is detected individually by sensors SE11 and SE12, respectively.

In the present copy machine, an automatic document feeder 100 is incorporated above glass platen 18. A discharge device including a hot melt type binder unit 600 is provided at the sheet discharge outlet side of image formation unit 70.

Automatic document feeder 500 conveys a document set on a document stocker 510 to glass platen 18 by a sheet feed roller 501, an unloosen roller 502, an unloosen pad 503, an intermediate roller 504, a resist roller 505, and a transport belt 506. The document read out by document reader IR is discharged on a document discharge tray 511 by transport belt 506 and discharge roller 509. Automatic document feeder 500 includes a document scale 512, a document sensor SE50 for detecting presence of a document, a document size sensor SE51 for detecting the size of a document, and a document discharge sensor SE52.

In copying a plurality of sheets of documents, the documents are set in a stack on document stocker 510 in a face-up state by the operator. When a copy operation command is issued via print key 96, each of the documents in document stocker 510 is pulled out one sheet at a time in order starting from the bottom document (the document of the last page). The pulled out document sheet is properly set at a predetermined read position on glass platen 18 with its front side facing downwards.

When a one side document mode is set, the document is conveyed leftward in the drawing after the read out operation to be discharged on document discharge tray 511 with the front side upward. When a duplex document mode is set, the document is conveyed leftwards in the drawing after the read out operation of the front side is completed. The document has its face inverted by an inversion roller 507 to return to the readout position on glass platen 18. When the readout operation of the back side of the document is completed, the document is conveyed leftwards in the drawing to be discharged on document discharge tray 51.

Binder unit 600 is attached at the side surface of printer unit PRT. Binder unit 600 is an additional device for carrying out a binding process automatically. In a binding process, a predetermined number of copies are bound together.

In a bind mode, a sheet discharged by discharge roller 85 in printer unit PRT is guided beneath a switching claw 601 that is switched in the direction for binding by a solenoid not shown. The sheet is transferred into a binding unit 631. Every predetermined number of copies are bound together and discharged on a bind discharge tray 636.

Before the first sheet of each predetermined number of copies (the number of copies to be bound) is sent into binder unit 631, a bind cover is supplied from a bind cover accommodation tray 630. The bind cover is sent to bind unit 631 to attain a standby state with its leading edge in contact with the upper portion of bind transportation roller 632.

Under this state, the sheet discharged from printer unit PRT is transferred into bind unit 631 by bind sheet roller 633. When a predetermined number of sheets are accommodated in binder unit 631, a binder pressing plate 634 is shifted leftwards in the drawing to form contact between the sheets and the bind cover. The closely pressed predetermined number of sheets and the bind cover are conveyed by binder transport roller 632 to be attached by compression by bind heat plate 635.

Bind heat plate 635 is heated in advance by a bind heater 637. The predetermined number of copy sheets and the bind cover are subjected to compression for a predetermined time by bind heat plate 635 to be bound in the hot melt method. After the binding, bind heat plate 635 is shifted downwards, and bind transport roller 632 rotates again. As a result, the bundle of the bound predetermined number of sheets is discharged on bind discharge tray 636.

When not in a bind mode, the sheet discharged by discharge roller 85 in printer unit PRT is guided above switching claw 601 that is set in a normal orientation by a solenoid not shown to be output normally on discharge tray 621.

2. Structure of Control Circuit and the Like

The control circuit of the copy machine of the present invention will be described hereinafter with reference to FIGS. 2–6.

Figure 2:
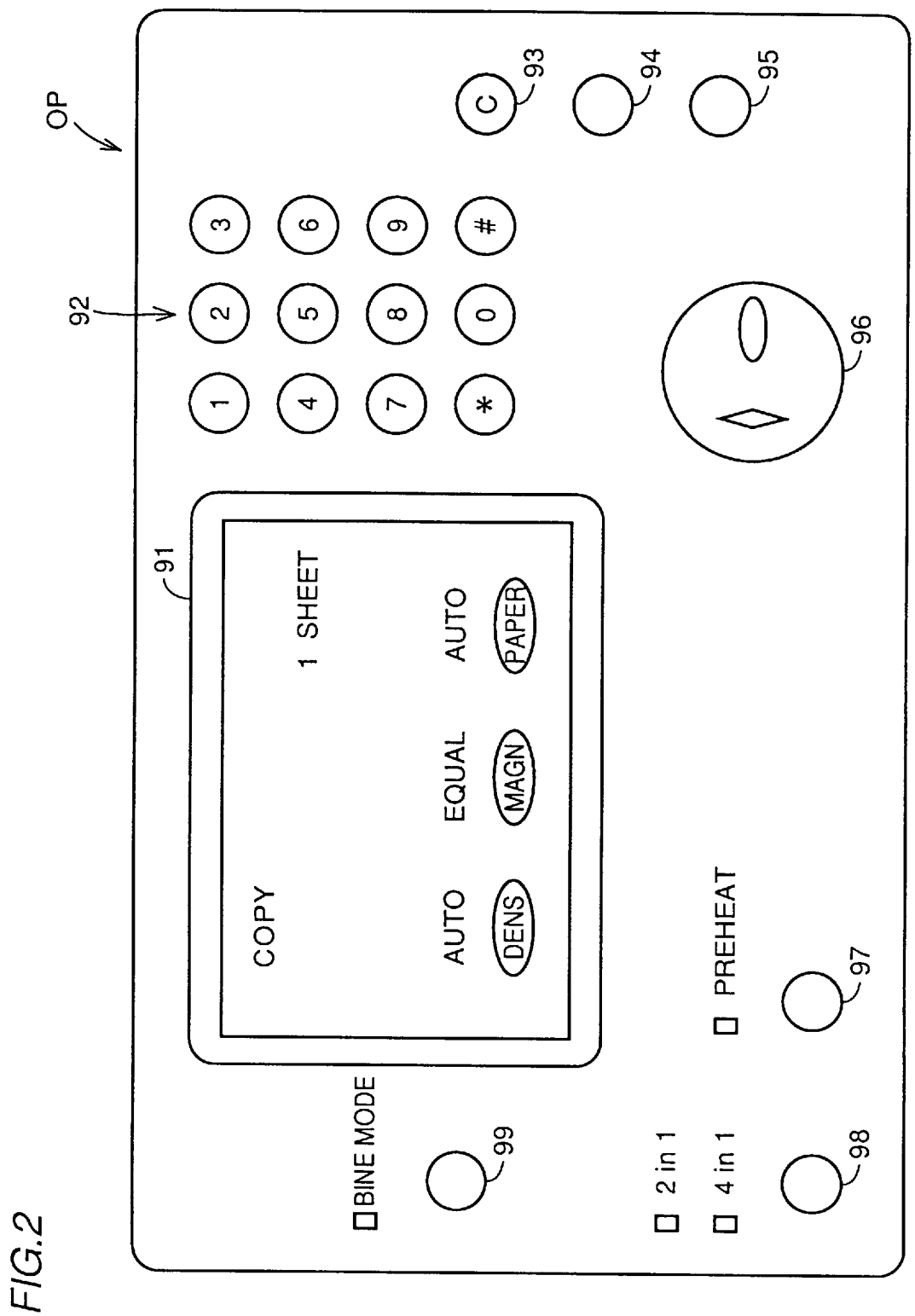
FIG. 2 is a diagram showing an operation panel of the copy machine.

Referring to FIG. 2, a ten key 92 for entering the numeric values of the number of copies and the copy magnification and the like, a clear key 93 for resetting the numeric value to a standard value, a panel reset key 94 for resetting the values set within the copy machine to a standard value, a stop key 95 for entering an instruction to cease the operation, a start key 96 for initiating an operation, a preheat key 97 for designating a preheat mode, a preheat display LED turned on for indicating the set state of a preheat mode, a saving mode key 98 for alternately setting and canceling a save copy mode (2-in-1 copy mode, 4-in-1 copy mode), a 2-in-1 display LED and a 4-in-1 display LED turned on indicating the set state of a 2-in-1 copy mode and a 4-in-1 copy mode, a bind mode key 99 for designating setting of a bind mode, a bind display LED turned on to indicate a set state of a bind mode, and a liquid crystal panel 91 for displaying a relevant message and a touch panel switch are provided on operation panel OP.

Figure 3:
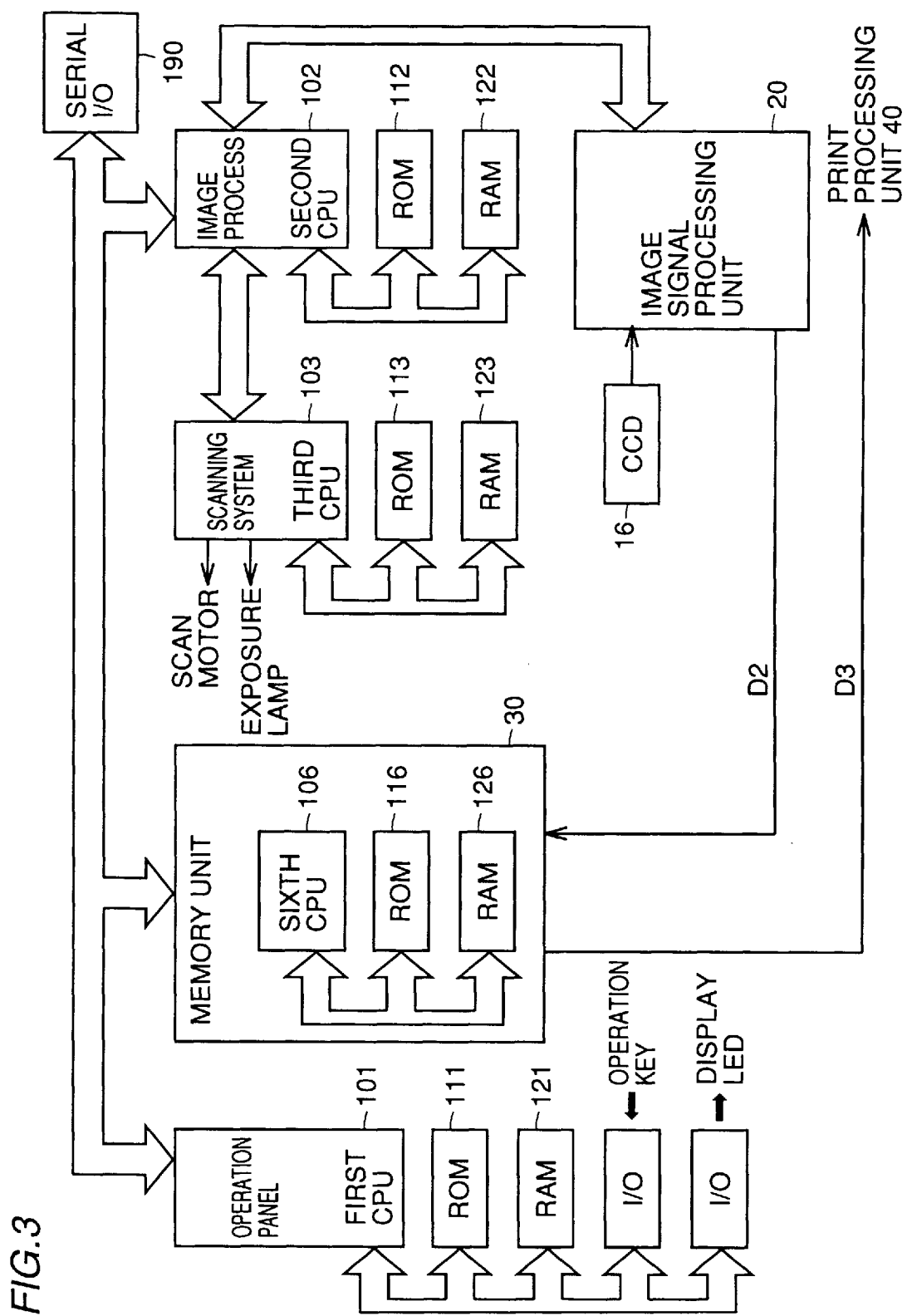
FIG. 3 is a block diagram showing one part of a control circuit of the copy machine.
Figure 4:
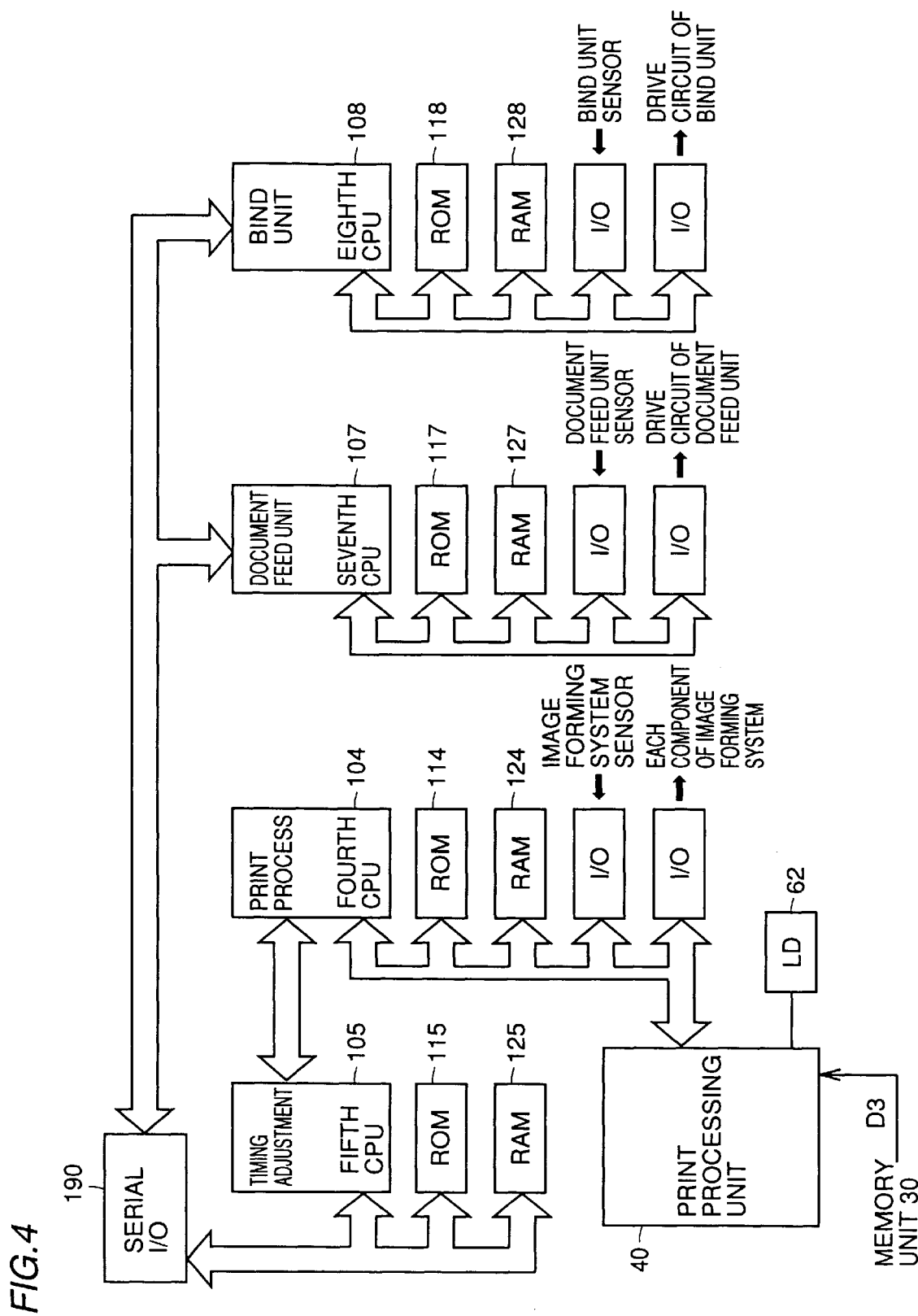
FIG. 4 is a block diagram showing the remaining portion of the control circuit of the copy machine.

As shown in FIGS. 3 and 4, the control circuit of the copy machine of the present invention includes eight CPUs, i.e. first CPU 101 to eighth CPU 108. ROM 111–ROM 118 in which various programs are stored, RAM 121–RAM 128 serving as a work area and the like are connected to each CPU 101–108. It is to be noted that sixth CPU 106 is provided in memory unit 30. First CPU 101, second CPU 102 and sixth CPU 106 are connected to each other by a command line connected to a serial I/O 190. Serial I/O 190 is also connected to fifth CPU 105, and to a command line that connects seventh CPU 107 and eighth CPU 108. Furthermore, second and third CPUs 102 and 103, and fourth and fifth CPUs 104 and 105 are respectively connected to each other by a command line.

First CPU 101 receives an input from each of operation keys 92–99 of operation panel OP and each touch panel switch of liquid crystal panel 91 to control display of each display LED and liquid crystal panel 91. For this purpose, each key switch, LED elements, and liquid crystal panel 91 of operation panel OP are connected to first CPU 101 I/O.

Second CPU 102 controls image signal processing unit 20. Second CPU 102 also controls the operation of scanning system 10 via third CPU 103 by designating a scan operation to third CPU 103. For this purpose, the drive circuit of exposure lamp 11, and scan motor M2 to shift mobile unit 19 and the like of scan system 10 in a sub-scanning direction are connected to the I/O for third CPU 103. An image signal from CCD 16 is input to image signal processing unit 20 connected to second CPU 102. The image signal is subjected to a predetermined process to be converted into image data D2. Image data D2 is sent to memory unit 30.

Figure 5:
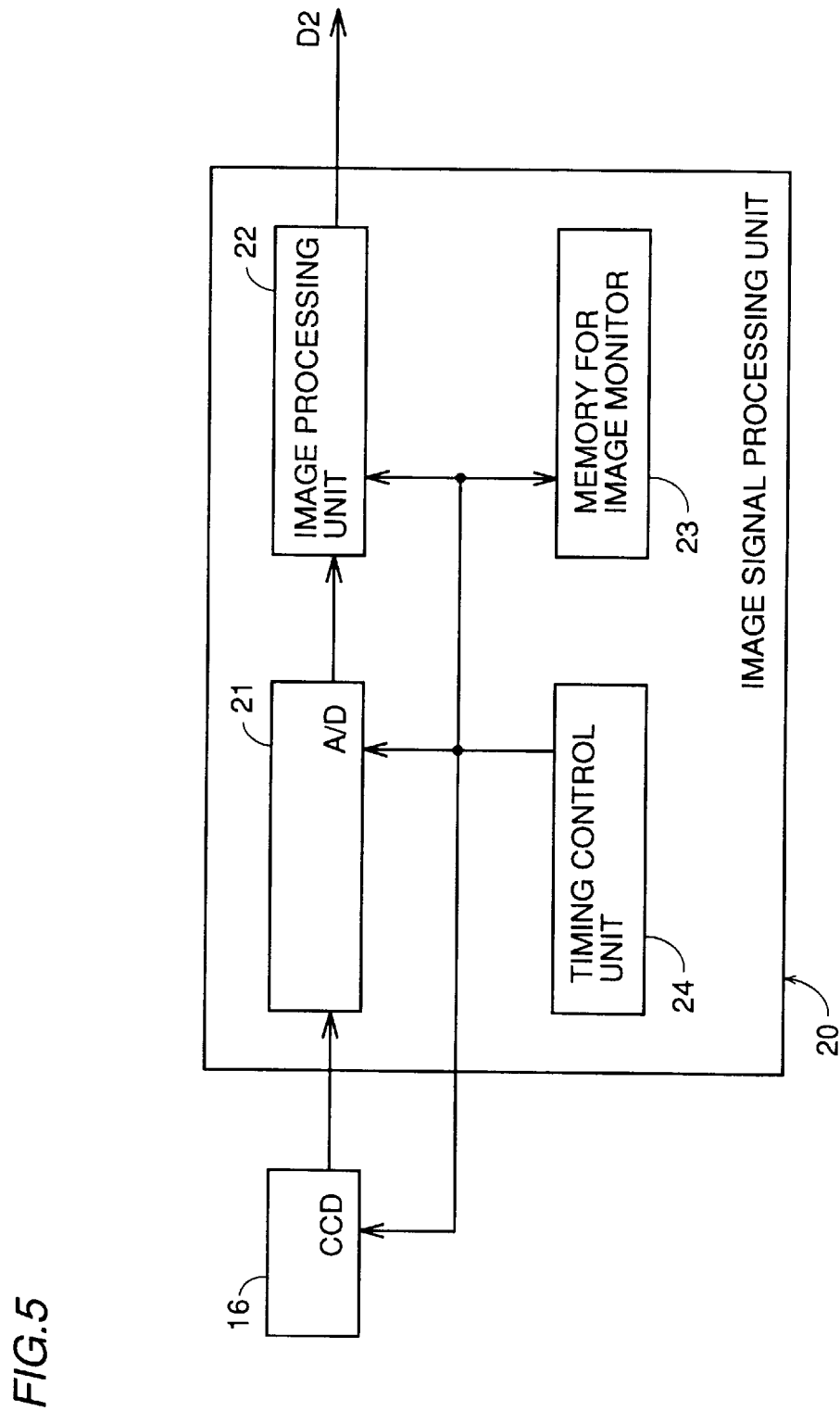
FIG. 5 is a block diagram showing in detail an image signal processing unit.

As shown in FIG. 5, image signal processing unit 20 includes an A/D converter 21, and an image processing unit 22 for carrying out the well known image processes such as shading correction, variable scale magnification, and picture quality correction. Image signal processing unit 20 also includes an image monitor memory for storing sample data and the like for shading correction, and a timing controller 24 for providing a synchronizing signal for the operation of each component. The image signal from CCD 16 is A/D-converted to be quantized into a 8-bit image data. Then, the image data is subjected to a relevant process such as shading correction, MTF correction, $\gamma$ correction, variable scale magnification process, and picture quality correction. The processed data is output to memory unit 30 as image data D2.

Fourth CPU 104 provides control of printer unit PRT including print processing unit 40. For this purpose, a drive circuit of main motor M1 and various clutches for operating various members in printer unit PRT and a sensor circuit for detecting the operation status and the like of each component in printer unit PRT are connected to the I/O of fourth CPU 104. Image data D3 sent from memory unit 30 is provided to print processing unit 40. Also, a drive circuit of laser diode 62 is connected to print processing unit 40.

Fifth CPU 105 provides control for adjusting the timing of the entire control circuit and for setting the operation mode. For this purpose, fifth CPU 105 is connected to fourth CPU 104 by a command line. Furthermore, serial communication is carried out with other CPUs 101, 102, 106, 107 and 108 to transmit and receive commands and reports required for control.

Sixth CPU 106 provides control of memory unit 30. More specifically, image data D2 from image signal processing unit 20 is compressed and stored in code memory 306. In a print operation, the compressed data read out from code memory 306 is expanded and provided to print processing unit 40.

Figure 6:
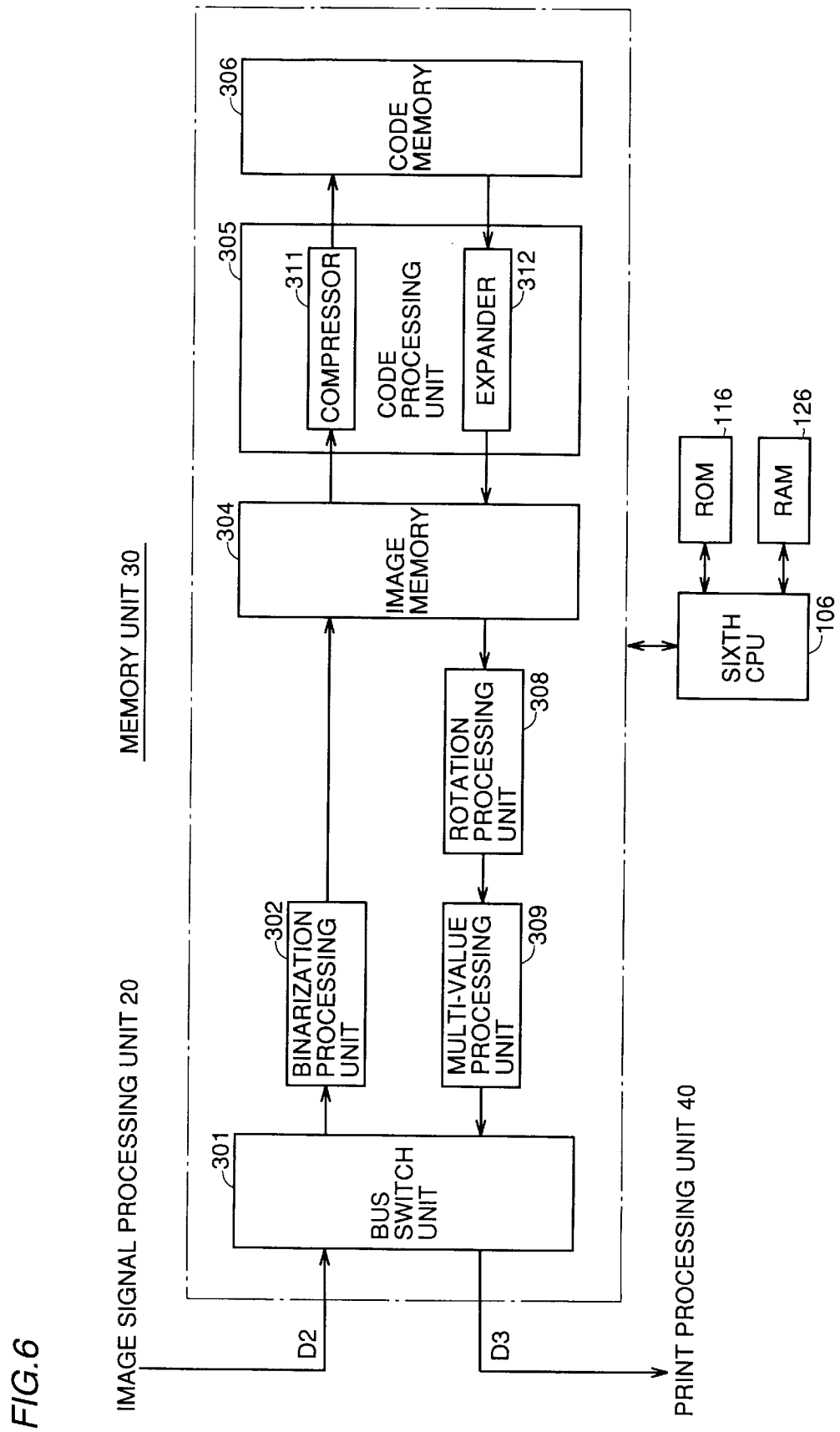
FIG. 6 is a block diagram showing in detail a memory unit.

As shown in FIG. 6, memory unit 30 includes a bus switch unit 301, a binarization processing unit 302, a multi-port image memory 304 having a capacity of 2 pages in A4 size at 400 dpi, a code processing unit 305 having a compressor 311 and an expander 312 that can operate independently, a multi-port code memory 306, a rotation processing unit 308, a multi-value processing unit 309, and sixth CPU 106 providing control to each component. In memory unit 30, image data is stored in code memory 306 in a compressed state.

In binarization processing unit 302, 8-bit image data D2 from image signal processing unit 20 via bus switch unit 301 is subjected to a binarization process in a range that can be restored to multi-value image data D3 by, for example, the dither method.

Code processing unit 305 has the image data read out from image memory 304 compressed by compressor 311. The compressed data is written into code memory 306. In code processing unit 305, code data which is to be printed out is read out from code memory 306 and expanded by expander 312. The expanded data is written into image memory 304. Compressor 311 and expander 312 are implemented to be operable independently and concurrently to improve the copy speed. Data is DMA-transferred to and from code memory 306 by a DMA controller not shown.

After the code read out from code memory 306 is expanded and reproduced as image data of one page, the image data is read out from image memory 304 to be subjected to a rotation process by rotation processing unit 308, if necessary, and then restored into multi-value image data by multi-value processing unit 309. This multi-value image data D3 is provided to print processing unit 40.

Figures 7A, 7B:
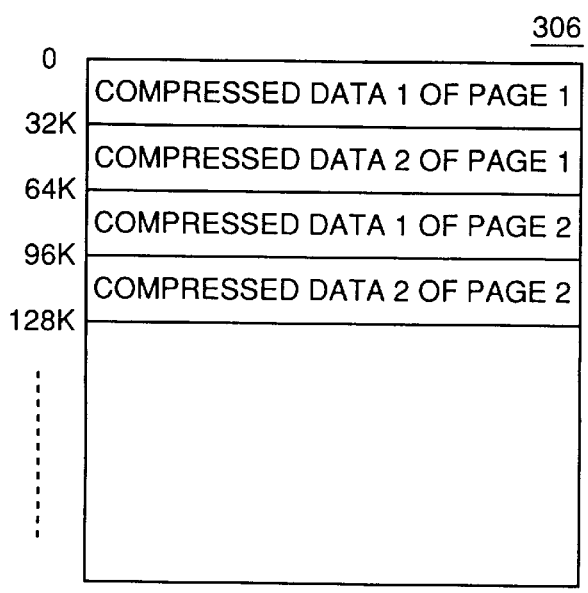
FIG. 7A is a diagram for describing a management table MT1 for a code memory provided in a RAM of a memory unit.
FIG. 7B is a diagram showing a memory region in the code memory.

Code memory 306 is divided into memory regions of 32 KB in unit. Each memory region stores code data on a page-by-page basis. This is to allow simultaneous control of writing and reading. Code memory 306 is governed according to management table MT1 in RAM 126 shown in FIGS. 7A and 7B.

In management table MT1, there are stored a region number for identifying each memory region in code memory 306, a page number PN for each original document that has been accorded in the writing sequence, "pre-concatenation" indicating the number of a memory region having code data stored that continuously precedes the code data stored in the relevant memory region for the same one page, "post-concatenation" indicating the number of a memory region having code data stored that continuously succeeds the code data stored in the relevant memory for the same one page, and various additional information such as compression method and data length required for the compression/expansion process. The value of "OO" for "pre-concatenation" implies that it is the first memory region of code data of one page, and the value of "FF" for "post-concatenation" implies that it is the last memory region of the code data of one page. Code memory 306 is governed dynamically according to this information.

Sixth CPU 106 produces the information of management table MT1 in reading out image data from image memory 304 for compression while controlling compressor 311 to store compressed data into code memory 306. In the output of image data, an operation opposite to the above operation is carried out. In other words, code data is read out from code memory 306. The information in management table MT1 is erased when data of a relevant page is properly read out and the print out of the specified number of sheets is completed.

Seventh CPU 107 provides control of the transportation, stop, and discharge operation of a document by automatic document feeder 500. Eighth CPU 108 provides control of the binding operation for every predetermined number of copied sheets (copied sheet having image formed) by binder unit 600.

3. Copy Operation Sequence

Figure 9:
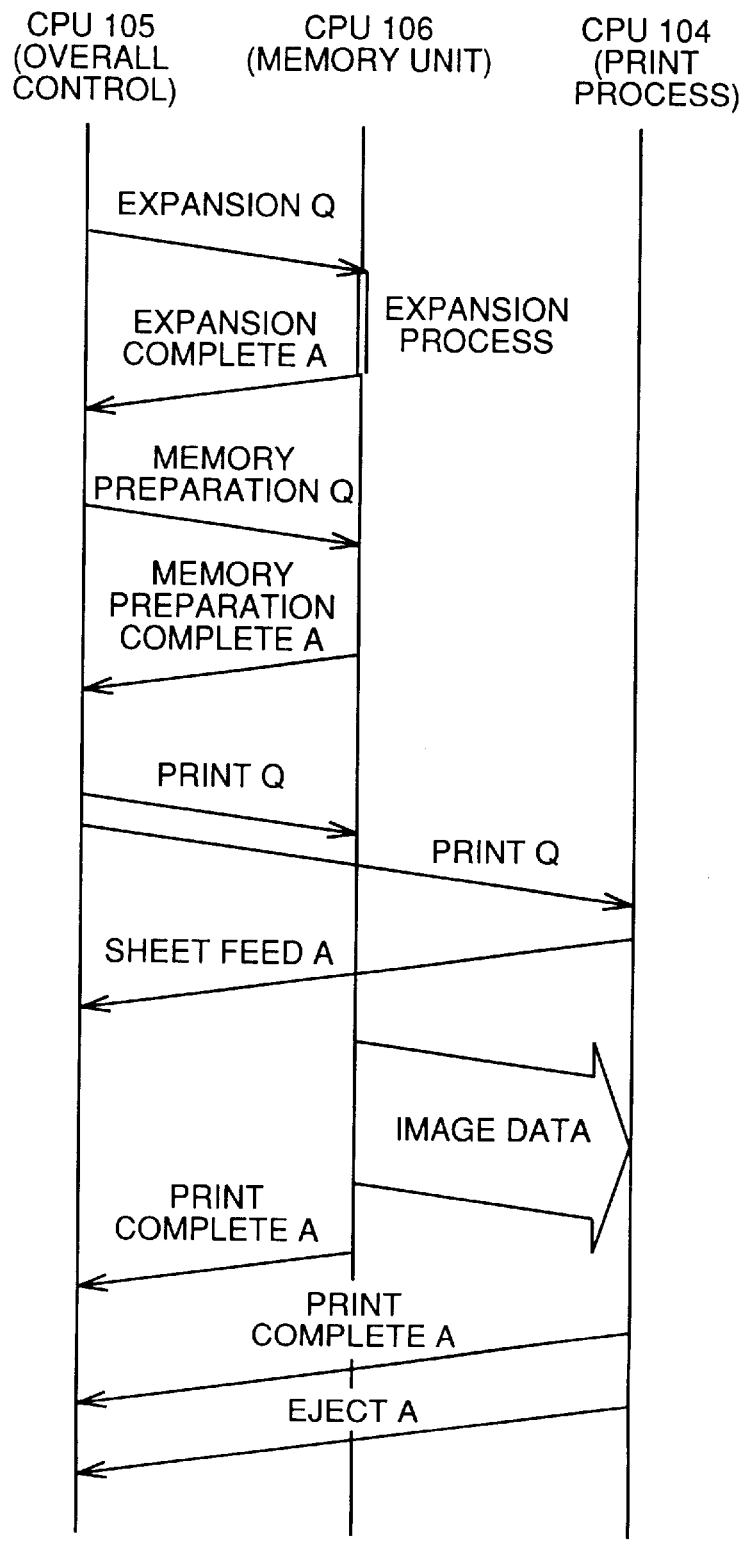
FIG. 9 shows an image read out operation sequence of the copy machine with transmission/reception of a request command and report between each CPU.

The operation sequence of copy machine 1 will be described hereinafter with reference to FIGS. 8 and 9 showing a request command Q and a report A transmitted/received between each CPU.

First, fifth CPU 105 that allows sequence control requests the memory to be prepared to sixth CPU 106 that allows control of memory unit 30. In response, sixth CPU 106 sets various information for the hardware of memory unit 30 such as the bus connection state for transferring image data D2 from image signal processing unit 20 to image memory 304, the mode for binarization (example: error diffusion method, threshold value for erasing base level, binarization threshold value), the start address of a write region of image memory 304, XY length information, and the like.

When the above specification is completed, sixth CPU 106 notifies fifth CPU 105 that the memory is ready. In response, fifth CPU 105 sends a request to sixth CPU 106 and second CPU 102 to read out the document image. Accordingly, second CPU 102 sends a request to third CPU 103 to carry out scanning. In response, the document image is scanned under control of third CPU 103. An image signal read out by scanning is processed by image signal processing unit 20 according to the image process mode set by second CPU 102. Image data D2 generated by this process is transferred to memory unit 30.

Completion of document image scanning is notified from third CPU 103 to second CPU 102. Also, completion of each readout operation is notified from second CPU 102 and CPU 106 to fifth CPU 105. Upon receiving this information, fifth CPU 105 provides a request to sixth CPU 106 to compress image data in image memory 304. In response, sixth CPU 106 sets various information such as the read out address of image memory 304, XY length information, the write address of code memory 306, the compression mode of compressor 311 (example: MH method) and the like to actuate each component. Thus, a compression process is carried out. The code data is stored in code memory 306.

Completion of a compression process is notified from sixth CPU 106 to fifth 105. When code memory 306 is full, a compression complete report with a parameter indicating compression disable is sent from sixth CPU 106 to fifth CPU 105. Accordingly, fifth CPU 105 can be made aware that code memory 306 is full.

The code data stored in code memory 306 as described above is read out in response to an expansion request sent from fifth CPU 105 to sixth CPU 106.

More specifically, when an expansion request is provided from fifth CPU 105 to sixth CPU 106, sixth CPU 106 sets various information such as the readout address of code memory 306, the XY length information, the expansion mode of expander 312 (example: MH method) to actuate each component. Thus, an expansion process is carried out. The expanded image data is written into image memory 304.

Completion of an expansion process is notified from sixth CPU 106 to fifth CPU 105. Accordingly, fifth CPU 105 sends a request to sixth CPU 106 to prepare the memory for reading out image data D3 from image memory 304. In response, sixth CPU 106 sets various information such as the bus connection state for transferring image data D3 from image memory 304 to print processing unit 40, the rotation process mode, the start address of the readout region of image memory 304, the XY length information and the like with respect to the hardware of memory unit 30.

When the above setting is completed, sixth CPU 106 notifies fifth CPU 105 that the memory is ready. Accordingly, fifth CPU 105 provides a print operation request to sixth CPU 106 and fourth CPU 104. In response, a sheet feed report indicating the fed state of the sheet is provided from fourth CPU 104 to fifth CPU 105. Then, image data D3 read out from image memory 304 is output to print processing unit 40 to be printed out.

Completion of a print operation is notified from sixth CPU 106 and fourth CPU 104 to fifth CPU 105. Also, an eject completion report is sent from fourth CPU 104 to fifth CPU 105. Fifth CPU 105 receiving these reports sends a memory clear request to sixth CPU 106, if necessary.

Thus, a copy operation sequence is carried out.

4. Description According to Flow Chart

The characteristic control of copy machine 1 will be described hereinafter according to the processes carried out by first CPU 101, fourth CPU 104, fifth CPU 105, and sixth CPU 106.

4-1. First CPU 101

Figure 10:
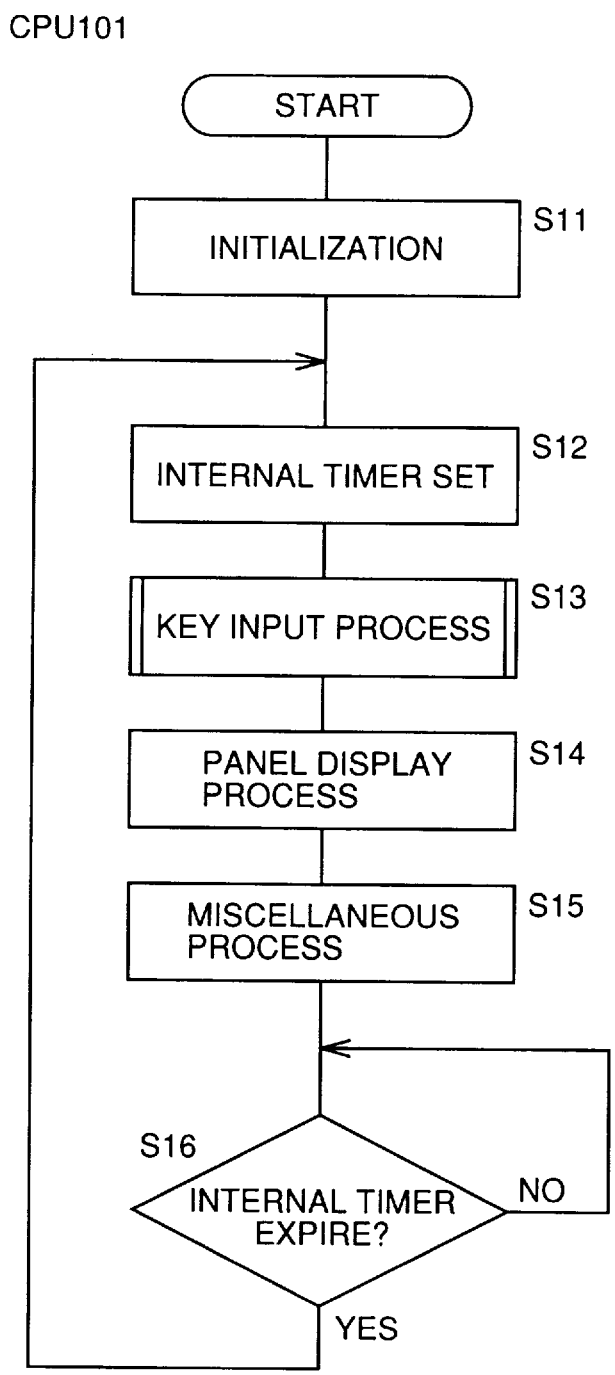
FIGS. 10–13 are flow charts showing the process of first to sixth CPU 101–106, respectively.

Referring to FIG. 10, initialization is carried out in first CPU 101 to initialize RAM 121, the register, and the like when power is turned on (S11).

Then, an internal timer defining the execution time of one routine is set (S12). A key input process receiving key entry is carried out (S13). A panel display process is carried out to turn on/off the relevant LED element and to provide display in liquid crystal panel 91 in response to the key entry (S14). Then, miscellaneous process (S15) for otherwise processes is carried out. Each of these processes is repeatedly carried out for every time period defined by the internal timer set at step S12. A communication process with another CPU is carried out appropriately by interruption.

Figure 14:
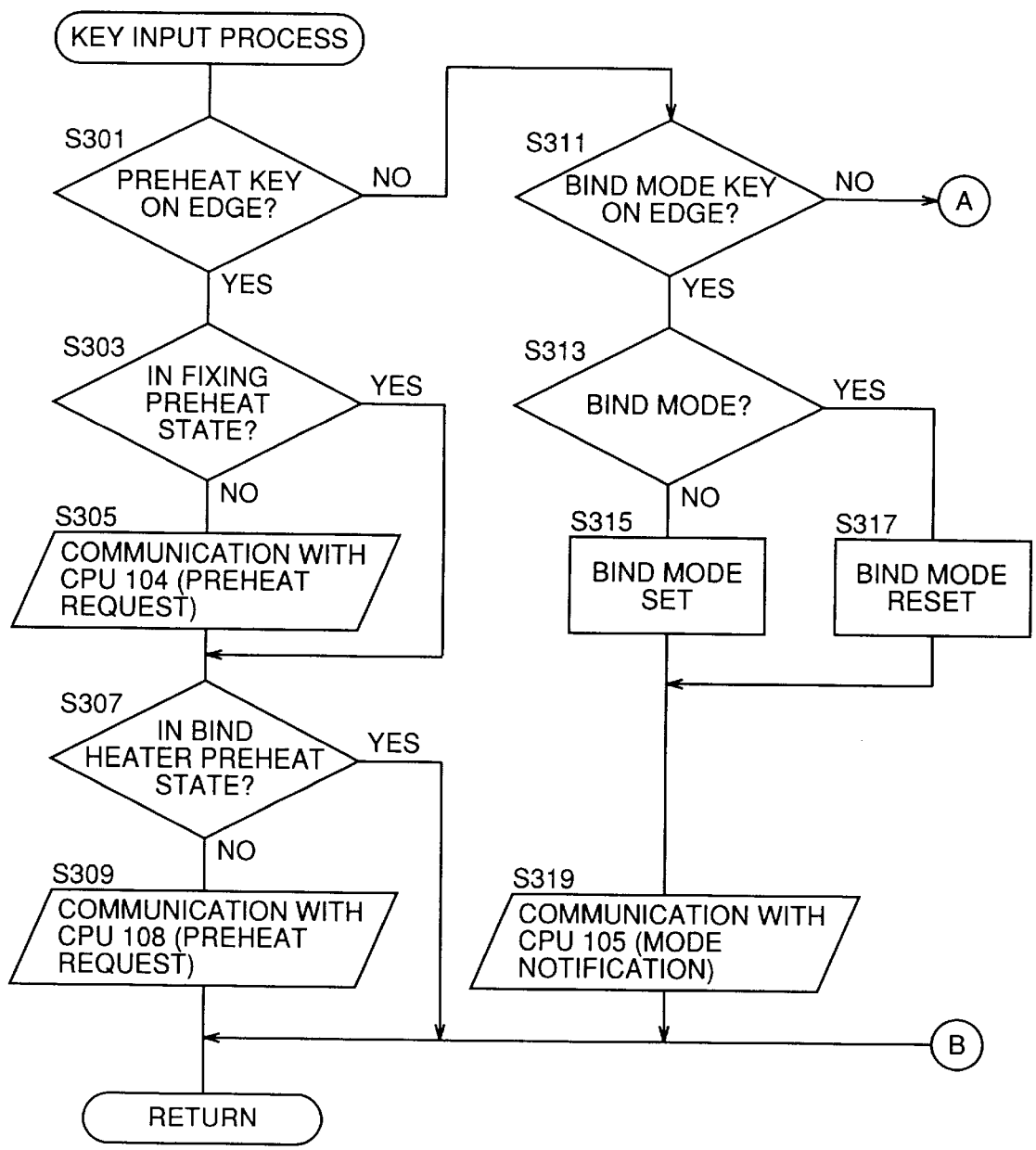
FIGS. 14 and 15 are flow charts showing a key input process.
Figure 15:
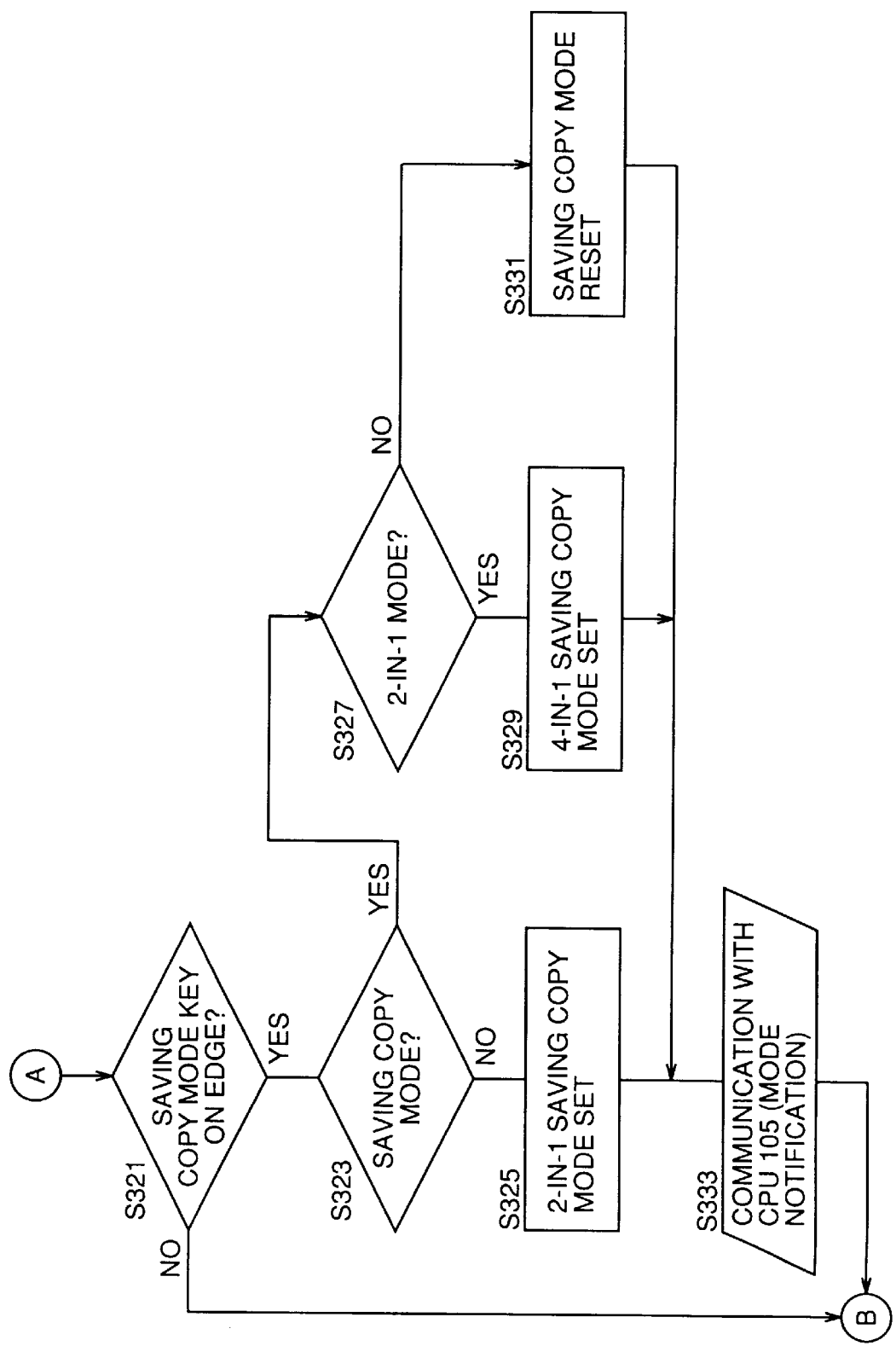

FIGS. 14 and 15 show the process carried out corresponding to operation of preheat key 97, binder mode key 99, and saving copy mode 98 of the processes executed in the key input process (S13) of FIG. 10.

When preheat key 97 is operated and a leading edge thereof is detected (S301; YES), a request is provided to fourth CPU 104 so as to set the mode ((from an operation mode)) to a preheat mode (standby mode) under the condition that fixing device 84 is not currently in a preheat state (S303; NO)(S305). Also, a request is provided to eighth CPU 108 to set the mode ((from the operation mode)) to the preheat mode (standby mode) under the condition that bind heater 637 of binder unit 600 is not currently in a preheat state (S307; NO)(S309).

In response, fourth CPU 104 controls the drive of the heater for fixing device 84 so that the temperature of the heat roller of fixing device 84 is maintained at a standby temperature lower than the operation temperature ((by lowering the heat roller temperature from the operation temperature that allows a fixing operation to the standby temperature)). Also, eighth CPU 108 controls the drive of bind heater 637 which is the heater for bind heat plate 635 so that the temperature of bind heating plate 635 is maintained at a standby temperature lower than the operation temperature ((by lowering the bind heat plate temperature from the operation temperature that allows a binding operation to the standby temperature)). The description in the double parenthesis implies that copy machine 1 attains an operation mode when preheat key 97 is operated, and the description without the parenthesis implies that copy machine 1 has just actuated when preheat key 97 is operated.

By the above control, power consumption can be reduced approximately 20% in a preheat mode (standby mode) according to the copy machine of the present invention. When fixing device 84 already attains a preheat state (S303; YES), or when bind heater 637 already attains a preheat state (S307; YES), the operation of preheat key 97 is neglected.

When bind mode key 99 is operated and a rising edge thereof is detected (311; YES), a bind mode is set (S315) when not yet set (S313; NO). When a bind mode is already set (S313; YES), the bind mode is reset (S317).

Then, the setting or cancel of a bind mode is notified to fifth CPU 105 (S319).

When saving copy mode key 98 is operated and a rising edge thereof is detected (S321; YES), the mode is altered according to the currently set mode. More specifically, when a saving copy mode is not set (S323; NO), a 2-in-1 copy mode is set (S325). When a 2-in-1 copy mode is set (S327; YES), a 4-in-1 copy mode is set (S329). When the 4-in-1 copy mode, not the 2-in-1 copy mode is set (S327; NO), the saving copy mode is reset (S331).

Then, the newly set mode by change of the saving copy mode (2-in-1 copy mode, or 4-in-1 copy mode, or cancel of the saving copy mode) is notified to fifth CPU 105 (S339).

4-2. Fourth CPU 104

Figure 11:
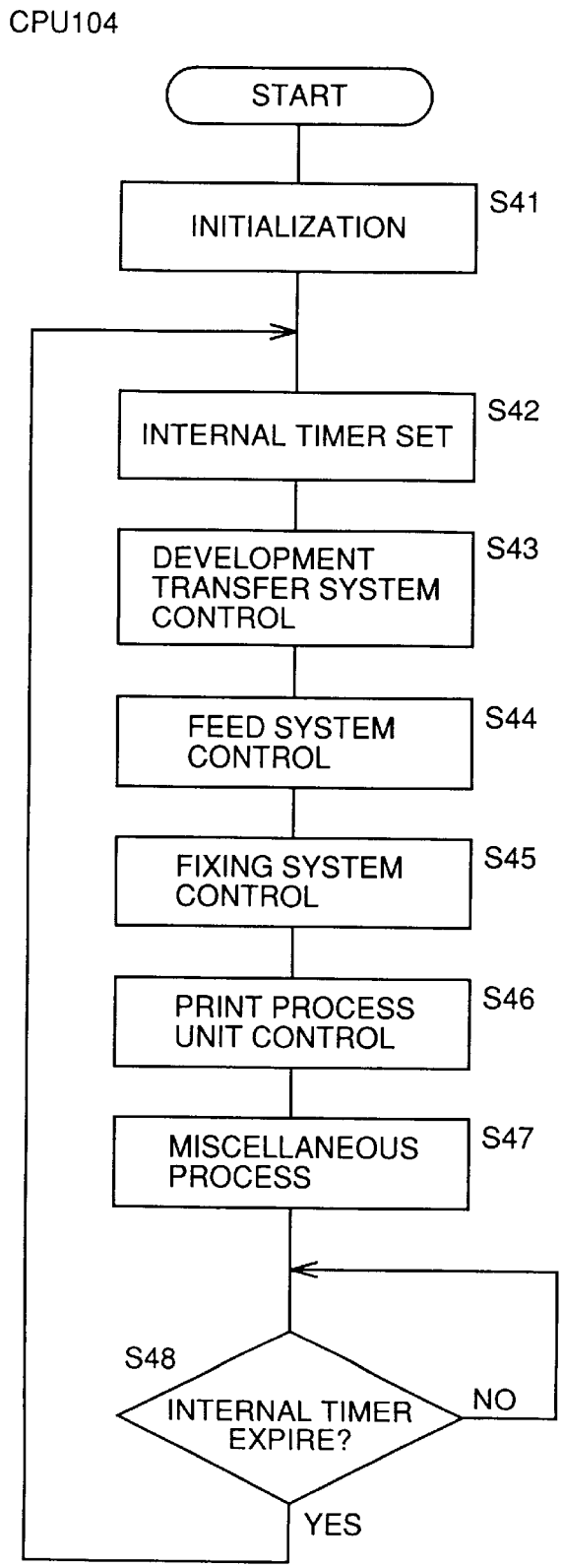

Referring to FIG. 11, initialization is carried out in fourth CPU 104 to initialize RAM 124, the register, and the like when power is turned on (S41).

Then, an internal timer for defining the execution time of one routine is set (S42). Control of the development and transfer system is provided (S43). Control of the transportation system is provided (S44). Control of the fixing system is provided (S45). Control of the print processing unit is provided (S46). Then, a miscellaneous process (S47) excluding the above processes is carried out. Each of these processes is repeatedly carried out for every time period defined by the internal timer set at step S42.

4-3 Fifth CPU 105

Figure 12:
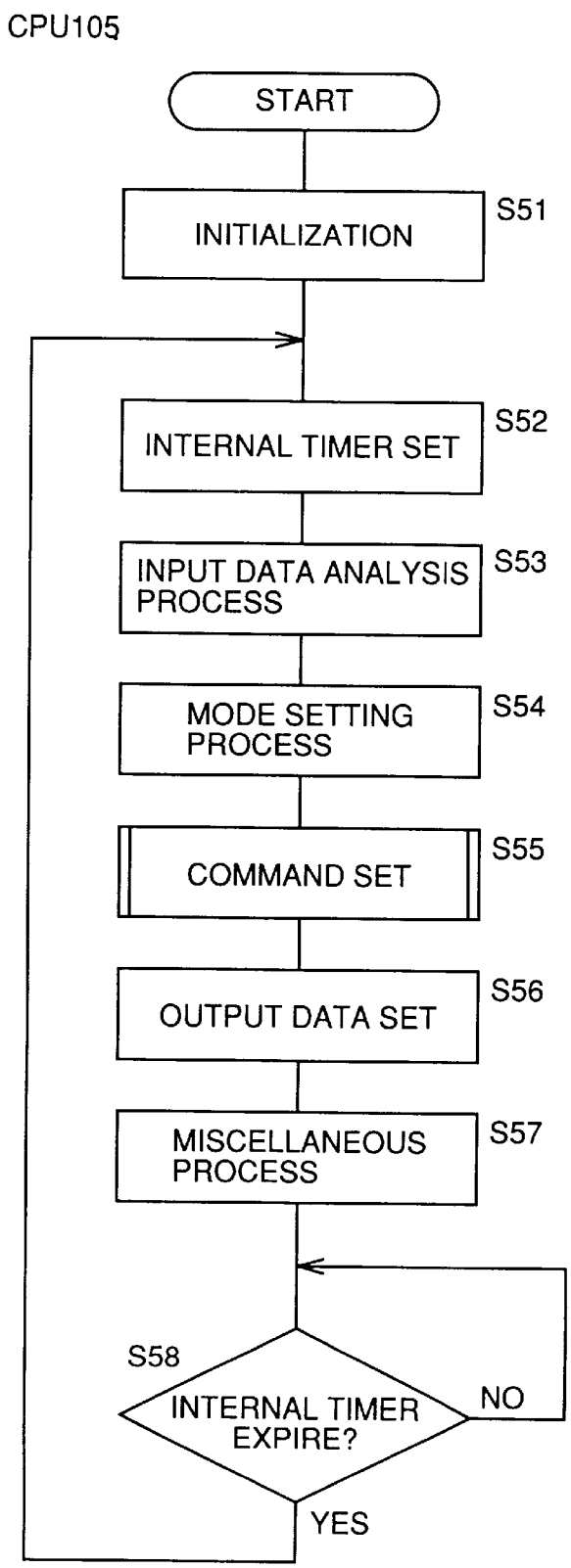

Referring to FIG. 12, initialization is carried out in fifth CPU 105 to initialize RAM 125, the register, and the like when power is turned on (S51).

Then, an internal timer defining the execution time of one routine is set (S52). An input data analysis process for checking input data from another CPU is carried out (S53). A mode setting process for defining an operation mode according to the manipulation content is carried out (S54). A command setting processing (S55) for setting a command according to the mode is carried out (S55). An output data set process (S56) for queuing the mode at the communication port is carried out (S56). Then, a miscellaneous process (S57) other than this processes is carried out (S57). Each of these processes is repeatedly carried out for every time period defined by the internal timer set at step S52.

Figure 16:
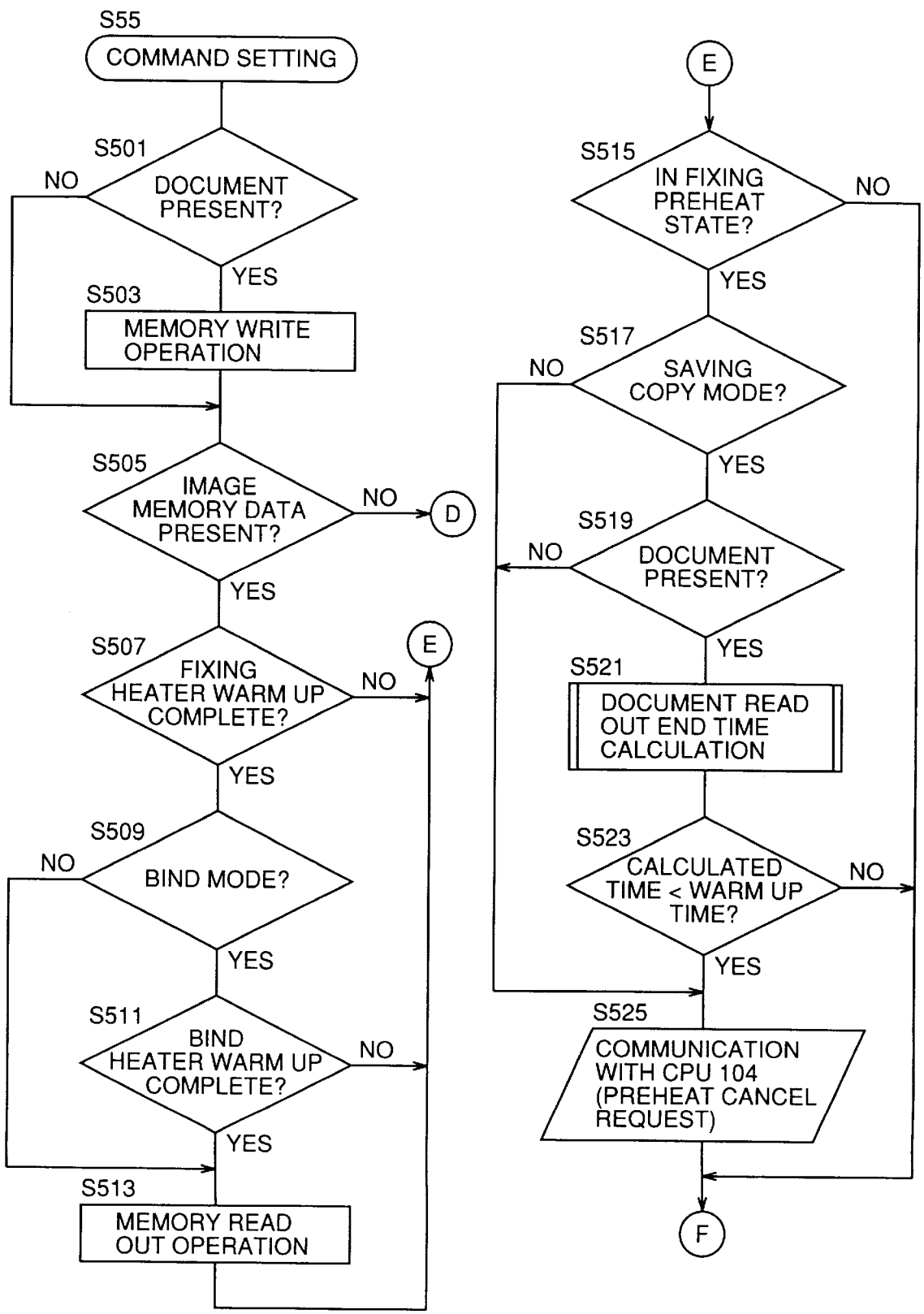
FIGS. 16 and 17 are flow charts showing a command setting process.
Figure 17:
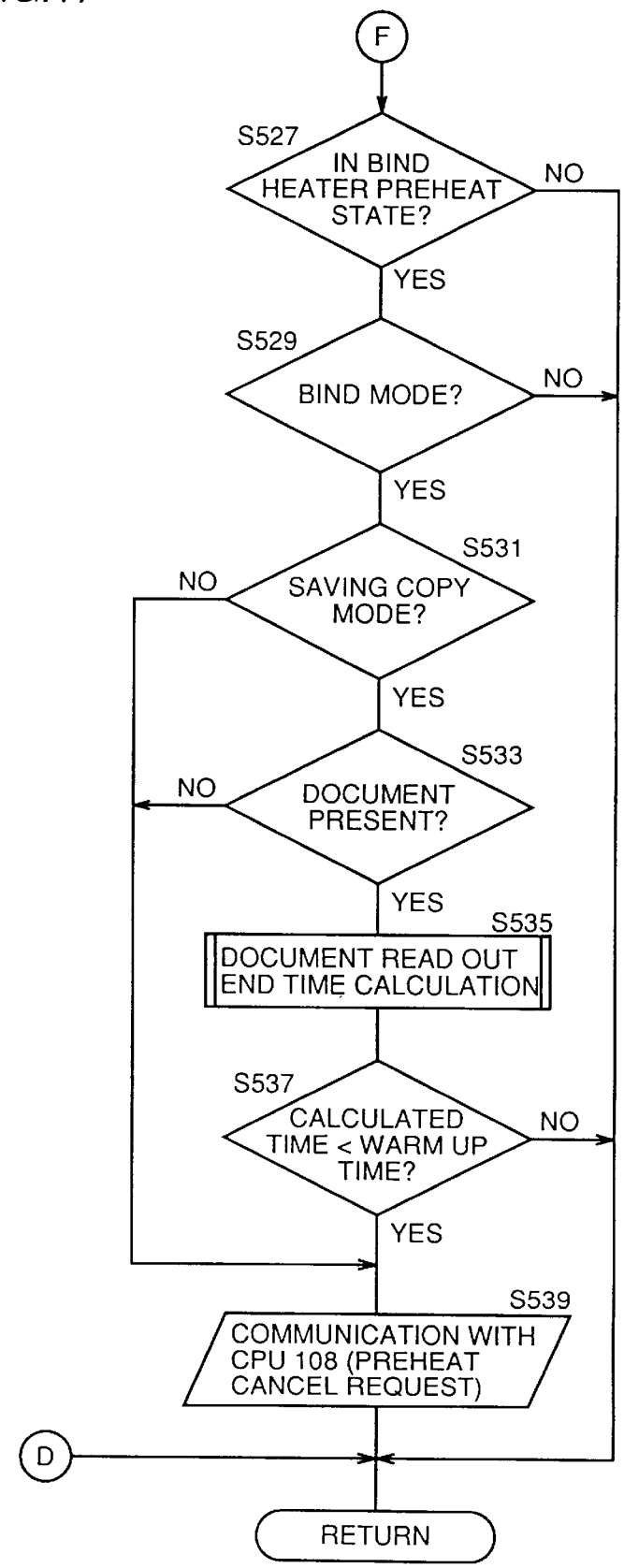
Figure 18:
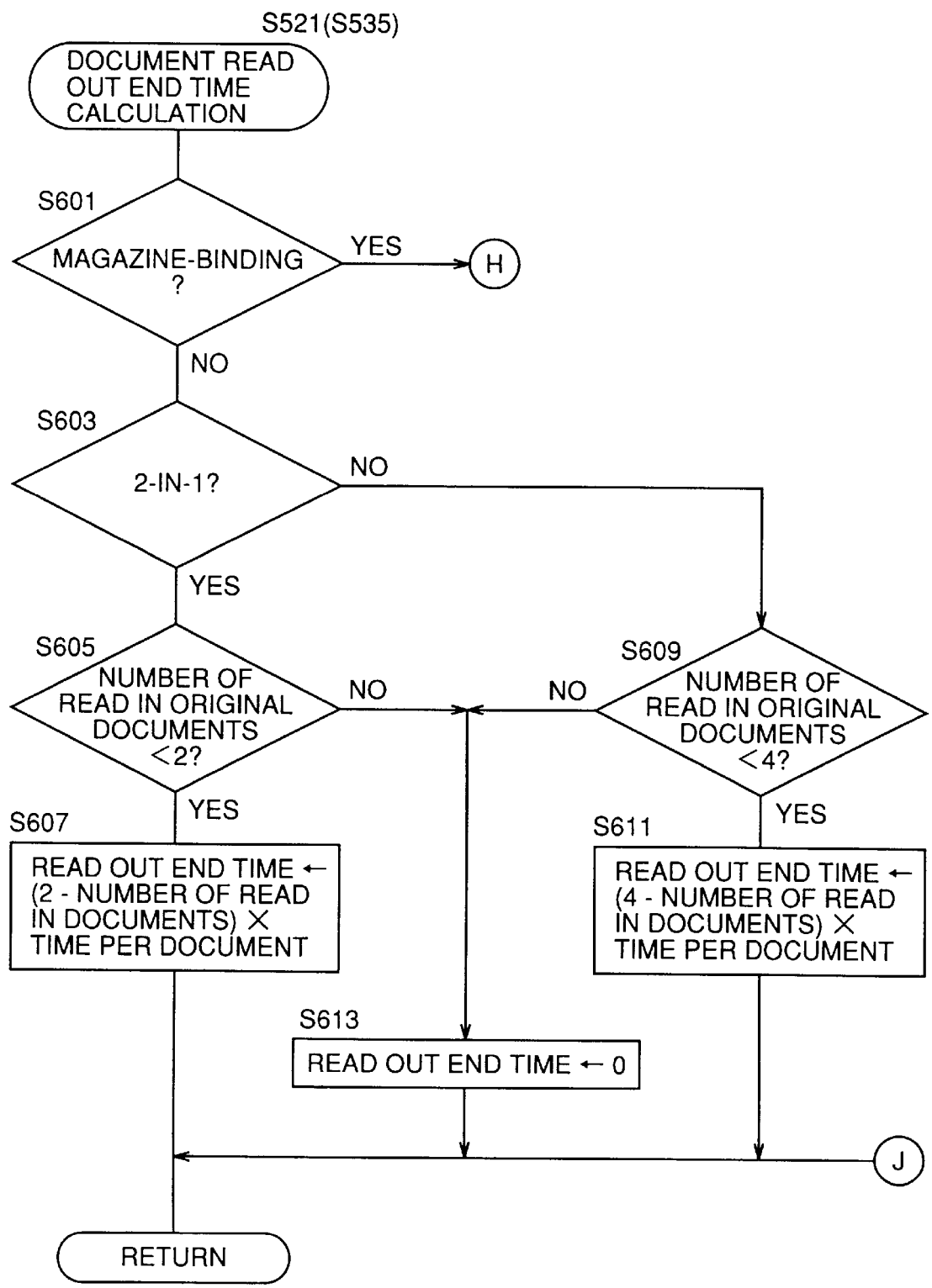
FIGS. 18 and 19 are flow charts of a process of calculating document readout end time.
Figure 19:
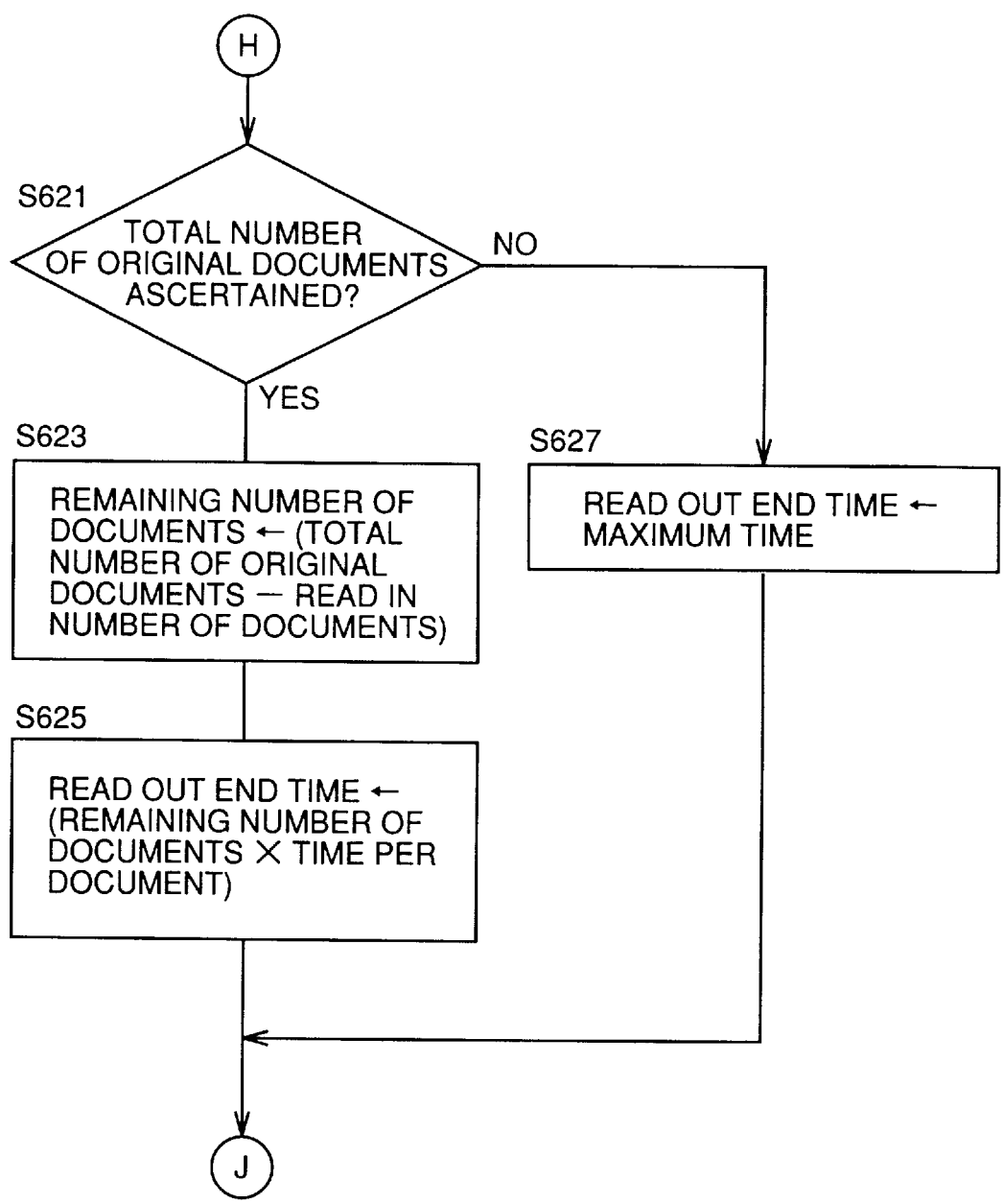
Figure 20:
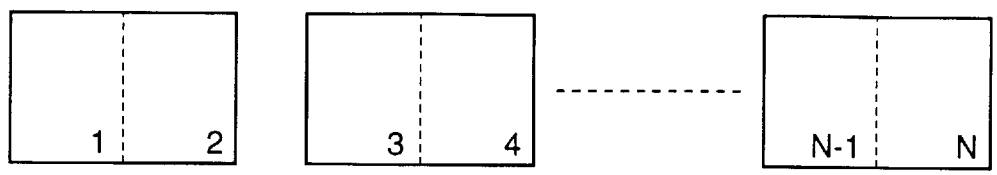
FIG. 20 is a diagram for describing folded-binding mode.
Figure 21:
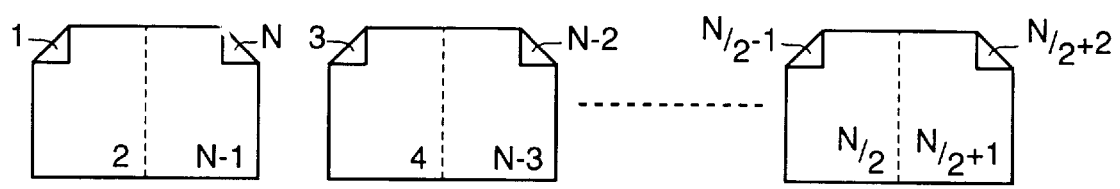
FIG. 21 is a diagram for describing a magazine-binding mode.

FIGS. 16 and 17 show a process carried out in the command set process (S55) of FIG. 12. FIGS. 18 and 19 show the process of calculating the document readout end time carried out according to FIGS. 16 and 17. Control is provided as set forth in the following with reference to FIGS. 16–19. When a saving copy mode is set, the standby time starting from the current time up to the time of finishing readout of a document that allows the first image formation operation is repeatedly calculated and updated. This repeatedly updated standby time is compared with the temperature increase time required to raise the temperature of the heat roller of fixing device 84 and bind heat plate 635 of binder unit 600 respectively to each operation temperature. When the standby time becomes shorter than the temperature increase time, the mode of the heater for heating the heat roller or bind heat plate 635 is switched to an operation mode from a standby mode.

When a copy operation is entered via start key 96, seventh CPU 107 is signaled to initiate a document convey process. Also, sixth CPU 106 is signaled to carry out memory preparation. When sixth CPU 106 is notified that the memory is ready, a document readout operation is issued to sixth CPU 106 and second CPU 102, and a document scanning operation is issued to third CPU 103.

When a document is conveyed under control of third CPU 103 to be set at a predetermined readout state on glass platen 18 (S501; YES), a command instructing a readout operation of a document and writing the data into the memory is set (S503). This command is issued to sixth CPU 106 and second CPU 102. Fifth CPU 105 can be notified that a document is set at a readout position by, for example, a detection result of document sensor SE50, and a report from seventh CPU 107 indicating that the document positioned at glass platen 18 has been read out and discharged.

Then, determination is made whether there is image data in code memory 306 (S505). Initially, there is no image in code memory 306 (S505; NO). In this case, the control returns to the main routine. This process of returning to the main routine in response to a "NO" determination at step S505 is repeated until the document image for one page is read out and the image data thereof is stored in code memory 306.

When at least one page of a document image is read out and stored in code memory 306, determination of YES is provided at step S505. Control proceeds to step S507 where determination is made whether the warm-up of fixing device 84 is completed or not. Since the preheat state (standby mode) for maintaining the heat roller of fixing device 84 at the standby temperature is not yet canceled at this time point, step S507 provides a determination of NO. Therefore, control proceeds to step S515. It is assumed that the preheat mode is set by preheat key 97 (refer to FIG. 14, step 305).

At step S515, determination is made whether fixing device 84 attains a preheat state in which the heat roller is maintained at the standby temperature. Since the preheat state (standby mode) of fixing device 84 is not yet canceled at this time point, step S515 provides a determination of YES. Then, control proceeds to step S517.

At step S517, determination is made whether the saving copy mode is set. The saving copy mode includes, in addition to the aforementioned 2-in-1 copy mode and 4-in-1 copy mode, a special image forming mode. In this special mode, the order of each document image to be formed on each sheet, and/or the area in the sheet on which each document image is to be formed must be determined according to the plurality of documents. For example, in a magazine-binding mode, a plurality of sheets having respective images formed at the left and right pages of a spread out sheet are stacked and bound at the center portion. The order of each image respectively formed at the left and right pages of each sheet will differ from the readout order of the document images. This means that the image formation operation cannot be initiated until all the documents are read out and the image to be formed at each portion on a sheet is ascertained. The saving copy mode of step S517 includes such a mode. In other words, the saving copy mode refers to any mode that cannot have the image formation operation carried out until all the plurality of documents are read out.

When the total number of documents is already ascertained in a 2-in-1 copy or a 4-in-1 copy mode, the image formation operation can be commenced at the time point when the maximum number of 2 or 4 documents are read out. However, when the total number of documents is not known and when the last document is to be read out first, it is desirable to suppress the image formation operation until all the documents are read out. Therefore, "a plurality of document images" in a 2-in-1 copy or a 4-in-1 copy mode implies the case of "2 or 4 document images" and also the case of "all document images". Under the control of the present invention, it is assumed that any case of this "plurality of document images" can be employed, and that the number of documents is already known by key entry and the like when the former is employed. When the latter is employed, it is assumed that the number of fed documents is counted by automatic document feeder 500. In the case of magazine-binding, "all document images" corresponds to the "plurality of document images".

When a save copy mode is not set (S517; NO), the preheat state (standby mode) of fixing device 84 is immediately canceled (S525) to initiate warm-up of fixing device 84. When not in a saving copy mode, an image formation operation onto a sheet is allowed after the first one page of the document image is read out and compressed image data thereof is stored in code memory 306. Therefore, there is no possibility of a long waiting time after warm-up of fixing device 84 is completed and until an image formation operation is commenced even when the warm-up of fixing device 84 is initiated immediately. Control is provided to eliminate any useless power consumption.

When determination is made that a saving copy mode is set at step S517 (S517; YES), control proceeds to step S519 to determine whether there is a document. When there is no document to be read out (S519; NO), i.e. when readout of the last document is completed, the preheat state (standby mode) of fixing device 84 is canceled (S525) to initiate warm-up of fixing device 84 since the image formation operation can be initiated any time. This step S519 is provided taking into account the case of carrying out a 2-in-1 copy for one document or a 4-in-1 copy for only one to three documents. The standby time calculated in step S521 that will be described afterwards (the estimated required time period until the readout operation of a document that allows the first image formation operation is completed) is not an accurate value. There may be a case where there is no more documents to be read out before the determination of YES is output at step S521. In such a case, there will be no problem even if warm-up of fixing device 84 is commenced immediately. Also, it is desirable to ensure completion of the warm-up of fixing device 84 when an image formation operation is to be initiated. Step S519 is provided taking into the above circumstance into account.

When determination is made that there is a document at step S519 (519; NO), a document readout end time calculation process is carried out (S521). In this process, the estimated required time (standby time) starting from the current time up to the completion of the readout operation of a document that allows commencement of the first image formation operation is calculated. Details of this process will be described afterwards.

In step S523, the latest standby time calculated at step S521 (the estimated time period until the readout operation is completed of a document that allows initiation of the first image formation operation) is compared with the temperature increase time period that is required for raising the temperature of the heat roller of fixing device 84 from the standby temperature (preheat temperature) to the operation temperature that allows a fixing operation.

When "standby time < temperature increase time", i.e. when it is estimated that the temperature of the heat roller of fixing device 84 cannot be raised to the level of the operation temperature before the image formation operation start time unless warm-up of fixing device 84 is immediately initiated (S523; YES), the preheat state (standby mode) of fixing device 84 is canceled (S525) and warm-up of fixing device 84 is initiated.

When "standby time ≧ temperature increase time", i.e. when it is estimated that the temperature of the heat roller of fixing device 84 can be raised to the level of the operation temperature before the time the first image formation operation starts even if warm-up of fixing device 84 is not immediately initiated (S523; NO), the preheat state (standby mode) of fixing device 84 is maintained.

The process of maintaining/canceling the preheat state (standby mode) of bind heat plate 635 of binder unit 600 (steps S527–S539) is carried out in a manner similar to the process for maintaining/canceling the preheat state (standby mode) of fixing device 84.

For example, when bind heater 637 attains a preheat state (standby mode) (S527; YES), and when a bind mode is set (S529; YES), control proceeds to S53. When the saving copy mode is set (S531; YES), and when there is a document to be read out (S533; YES), the document read out end time calculation process is carried out (S535). The calculated time is compared with the temperature increase time required for increasing the temperature of bind heat plate 635 of binder unit 600 from the standby temperature (preheat temperature) to the operation temperature that allows a binding operation (S537). When the calculated standby time (the estimated time period required until the readout operation is completed of a document that allows the first image formation operation) is shorter than the temperature increase time (S537; YES), the preheat state (standby mode) of binder unit 600 is canceled (S525) to initiate the warm-up of bind heat plate 535.

The process corresponding to the case where a saving copy mode is not set (S531; NO) is similar to the process (steps S515-S525) for maintaining/canceling the preheat state (standby mode) of fixing device 84.

When the above-described process of step S525 is carried out and the warm-up of the heat roller of fixing device 84 is completed, determination of step S507 that is next carried out provides a determination of YES. When not in a bind mode (S509; NO) under this state, the process of step S513 is immediately carried out. More specifically, image data readout for a print operation is carried out. Also, the image formation operation sequence is subsequently carried out.

Thus, when the above-described process of step S525 is carried out to result in the determination of YES at step S507, and when the process of step S539 in a bind mode is carried out to complete warm-up of bind heat plate 635 of binder unit 600, determination of the next executed step S511 indicates YES. The process of step S513 is carried out to read out image data for a print operation. Also, the image formation operation sequence is subsequently carried out.

"Document readout end time calculation process" carried out at steps S521 and S535 will be described hereinafter with reference to FIGS. 18 and 19.

When the read in number of original documents is less than 2 (S605; YES) under the setting of a 2-in-1 copy mode (S603; YES), the remaining number of original documents required to complete readout of 2 original documents is multiplied by the time required to read in one document. This multiplied value is set as the readout end time (S607). The above-described setting is provided since the "second original document" in the 2-in-1 copy mode is the document that allows initiation of the first image formation operation after reading out the relevant original.

Similarly, when the number of read documents is less than 4 (S609; YES) under the state where a 4-in-1 copy mode is set (S603; NO), the remaining number of documents required to be read out of four documents is multiplied by the time required to read in one document. This multiplied value is set as the readout end time (S611). Such a setting is provided since the "fourth document" in the 4-in-1 copy is the document that allows initiation of the first image formation operation after completion of reading the relevant document.

In the case when the number of read documents is at least two documents in a 2-in-1 copy mode (S605; NO), or when the number of read in documents is at least 4 documents in the 4-in-1 copy mode (S609; NO), the value of the readout end time is set to "0" since the image formation operation is to be initiated immediately (S613).

When a magazine-binding mode, not the 2-in-1 copy mode or the 4-in-1 copy mode, is set (S601; YES), the process of steps S621 et seq. is carried out.

When the total number of original documents is already known by key input or the like (S621; YES), the number of original documents already read in is subtracted from the total number of original documents. This value is set as the remaining number of documents to be read in (S623). Then, the value of the remaining documents set at step S623 is multiplied by the time required to read in one original document. This multiplied value is set as the readout end time (S625). In this case, the estimated time required until the last document is read in is set. Thus, control of the cancel timing of a preheat state (standby mode) can be provided at a sufficient accurate level since the start time of an image formation operation can be estimated properly when the total number of documents is determined in advance.

When the total number of original documents is unknown (S621; NO), the maximum time provided as the default is set as the document readout end time (S627). Control is provided so that the preheat state (standby mode) is not canceled before this maximum time period expires.

4-4. Sixth CPU 106

Figure 13:
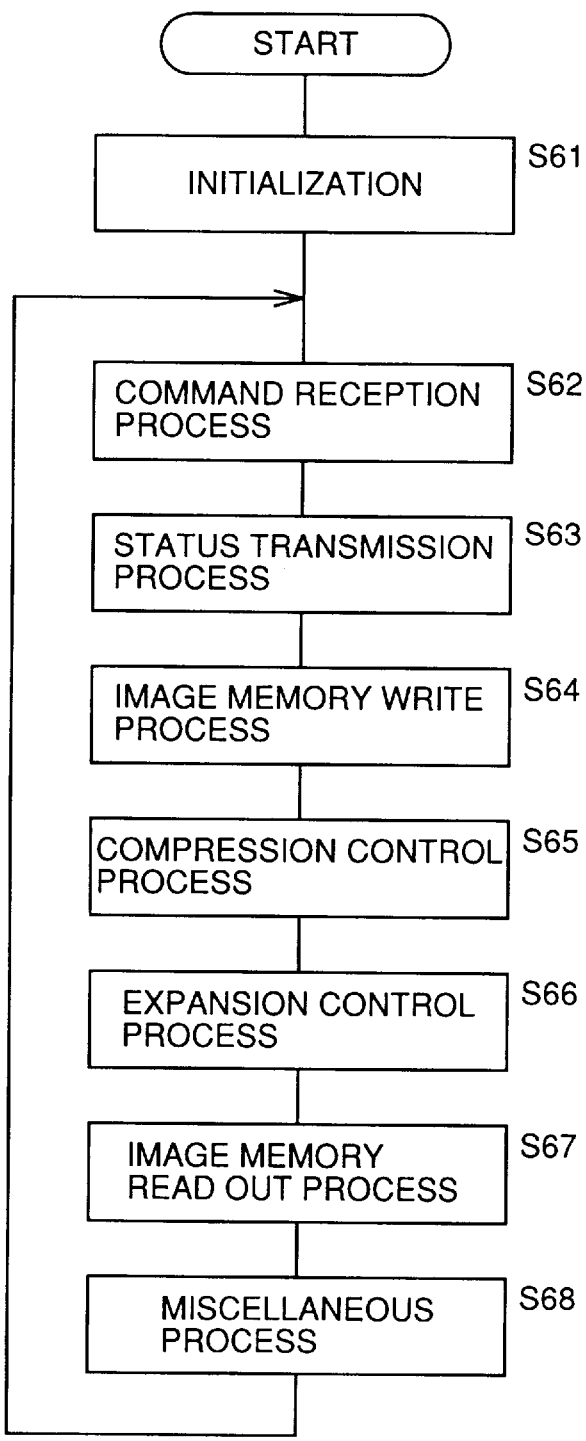

Referring to FIG. 13, initialization is carried out at sixth CPU 106 for initializing RAM 126, the register, and the like when power is turned on.

Then, a command reception process (S62), a status transmission process (S63), an image memory write process (S64), a compression control process (S65), an expansion control process (S66), an image memory readout process (S67), and a miscellaneous process (S68) are repeatedly carried out.

5. Alternative Control

The present invention is not limited to the control described in the foregoing wherein the required time period (standby time) starting from the current time up to the time read out is completed of an original that allows the first image formation operation is estimated; the estimated standby time is compared with a temperature increase time (the time required for the member to be heated to attain the operation temperature from the standby temperature); the standby mode is canceled when the standby time becomes shorter than the temperature increase time; and control is initiated to raise the member to be heated to the operation temperature and maintaining the member at that temperature level.

Alternatively, control can be provided as set forth in the following. The end time of completing read in of a document that allows initiation of the first image formation operation by finishing reading of a relevant original document is calculated. Then, the value of the time subtracting the temperature increase time from the calculated end time (the time earlier than the calculated end time by the temperature increase time) is obtained by calculation. This subtracted value is set as the cancel time. When the current time arrives at the cancel time, the preheat state is canceled. In the case of this control, the current time must be monitored and notified to fifth CPU 105. Furthermore, the total number of original documents must be determined.

Alternatively, control can be provided to cancel the preheat state (standby mode) when initiation of sheet feeding of the last original document is detected such as in the 2-in-1 copy mode and the 4-in-1 copy mode in which the total number of original documents is not known and copy is initiated from the last document, or the magazine-binding copy mode in which the total number of documents is not known. An advantage substantially similar to that of the previous embodiment can be achieved. It is to be noted that initiation of feeding of the last original document can be identified by the fact that sensor SE50 no longer detects an original document, for example.

In the control described in the foregoing, the preheat mode is set by operating preheat mode key 97. Alternatively, the preheat mode can be set in cooperation with the so-called automatic reset function. In this case, control must be provided so that the preheat mode is not canceled in response to the operation of opening the document cover and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus comprising:
    designation means for providing designation to carry out an image formation operation,
    read out means for initiating a readout operation of a document according to designation of said designation means,
    memory means for storing image data output from said readout means,
    image forming means for carrying out an image formation operation according to image data stored in said memory means,
    calculation means for calculating start timing of a first image formation operation in response to designation of said designation means,
    a member to be heated for operating at a predetermined temperature,
    switch means for switching between a standby mode in which said member to be heated is maintained at a standby temperature lower than said predetermined temperature and an operation mode in which said member to be heated is maintained at said predetermined temperature, and
    control means for controlling switching timing of said switch means so that said member to be heated arrives at said predetermined temperature at said start timing of an image formation operation.

2. The image formation apparatus according to claim 1, wherein said calculation means determines said start timing of an image formation operation by calculating a readout operation end time by said readout means.

3. The image formation apparatus according to claim 2, wherein said member to be heated fixes an image on a sheet.

4. The image formation apparatus according to claim 3, wherein said image forming means forms an image by an electrophotographic system, and said member to be heated melts a toner image formed on said sheet to fix an image on said sheet.

5. The image formation apparatus according to claim 2, wherein said member to be heated melts an adhesive to bind a plurality of sheets having an image formed thereon into one bundle.

6. An image formation apparatus comprising:
    designation means for providing designation to carry out an image formation operation,
    document feed means that can accommodate a plurality of documents for sequentially feeding a mounted document one at a time to read out means according to designation of said designation means,
    number of readout documents set means for setting the number of documents to be read out,
    read out means for sequentially reading out a document fed by said document feed means,
    memory means for storing image data output from said readout means,
    image forming means for carrying out an image formation operation according to image data stored in said memory means,
    calculation means for calculating a time required to read out a set number of documents to obtain said start timing of an image formation operation,
    a member to be heated for operating at a predetermined temperature,
    switch means for switching between a standby mode in which said member to be heated is maintained at a standby temperature lower than said predetermined temperature and an operation mode in which said member to be heated is maintained at said predetermined temperature, and
    control means for controlling switching timing of said switch means so that said member to be heated arrives at said predetermined temperature at said start timing of an image formation operation.

7. The image formation apparatus according to claim 6, wherein said member to be heated fixes an image on a sheet.

8. The image formation apparatus according to claim 7, wherein said image forming means forms an image by an electrophotographic system, and said member to be heated melts a toner image formed on a sheet to fix the image on the sheet.

9. The image formation apparatus according to claim 6, wherein said member to be heated melts an adhesive to bind a plurality of sheets having an image formed thereon into one bundle.

10. An image formation apparatus of a structure comprising:
    designation means for providing designation to carry out an image formation operation,
    document feed means that can accommodate a plurality of documents for sequentially feeding a mounted document one by one to read out means according to designation of said designation means,
    read out means for sequentially reading out a fed document,
    memory means for storing image data output from said read out means,
    image forming means for carrying out an image formation operation according to image data stored in said memory means,
    image formation mode setting means for setting an image formation mode to form an image corresponding to a plurality of documents of originals on one sheet,
    calculation means for calculating a time required to read out according to an image formation mode to obtain start timing of an image formation operation when said image formation mode is set,
    a member to be heated for operating at a predetermined temperature,
    switch means for switching between a standby mode in which said member to be heated is maintained at a standby temperature lower than said predetermined temperature and an operation mode in which said member to be heated is maintained at said predetermined temperature, and
    control means for controlling switching timing of said switch means so that said member to be heated arrives at said predetermined temperature at said start timing of an image formation operation.

11. The image formation apparatus according to claim 10, wherein said image formation mode is adapted to form images of two original documents read out continuously onto one sheet.

12. The image formation apparatus according to claim 11, wherein said member to be heated fixes an image on a sheet.

13. The image formation apparatus according to claim 12, wherein said image forming means forms an image by an electrophotographic system, and said member to be heated melts a toner image formed on said sheet to fix an image on said sheet.

14. The image formation apparatus according to claim 10, wherein said image formation mode is adapted to form images of four original documents read out continuously onto one sheet.

15. The image formation apparatus according to claim 14, wherein said member to be heated fixes an image on a sheet.

16. The image formation apparatus according to claim 15, wherein said image forming means forms an image by an electrophotographic system, and said member to be heated melts a toner image formed on a sheet to fix the image on said sheet.

17. The image formation apparatus according to claim 10, wherein said image formation mode is adapted to provide book-binding in a collated folded-binding manner when sequentially stacked sheets on which images are formed are bent into halves at the center portion and bound at the bent portion.

18. The image formation apparatus according to claim 17, wherein said member to be heated fixes an image on a sheet.

19. The image formation apparatus according to claim 18, wherein said image forming means forms an image by an electrophotographic system, and said member to be heated melts a toner image formed on said sheet to fix the image on said sheet.

20. The image formation apparatus according to claim 10, wherein said member to be heated melts an adhesive to bind a plurality of sheets having images formed thereon into one bundle.

21. An image formation method comprising the steps of:
designating execution of an image formation operation,
initiating a readout operation of a document according to said designation,
storing image data read out by said read out step,
carrying out an image formation operation according to said stored image data,
calculating start timing of a first image formation operation in response to said designation,
switching between a standby mode in which a member to be heated that operates at a predetermined temperature is maintained at a standby temperature that is lower than said predetermined temperature, and an operation mode in which said member to be heated is maintained at said predetermined temperature, and
controlling timing of said switching step so that said member to be heated arrives at said predetermined temperature at said start timing of an image formation operation.

22. An image formation method comprising the steps of:
designating execution of an image formation operation,
sequentially feeding a document one by one to a reader unit according to said designation step,
setting the number of documents to be read out,
sequentially reading out said fed document by a reader unit,
storing image data read out by said readout step,
carrying out an image formation operation according to said stored image data,
calculating a time required for reading out said set number of documents for obtaining start timing of an image formation operation,
switching between a standby mode in which a member to be heated that operates at a predetermined temperature is maintained at a standby temperature lower than said predetermined temperature and an operation mode in which said member to be heated is maintained at said predetermined temperature, and
controlling switching timing of said switching step so that said member to be heated arrives at said predetermined temperature at said start timing of an image formation operation.

23. An image formation method comprising the steps of:
designating execution of an image formation operation,
sequentially feeding a document one by one to a reader unit according to a designation of said designation step,
sequentially reading out said fed document with said reader unit,
storing said readout image data,
carrying out an image formation operation according to said stored image data,
setting an image formation mode to form an image corresponding to a plurality of documents on one sheet,
calculating a time required for read out according to an image formation mode to obtain start timing of said image formation operation when said image formation mode is set,
switching between a standby mode in which a member to be heated that operates at a predetermined temperature is maintained at a standby temperature lower than said predetermined temperature and an operation mode in which said member to be heated is maintained at said predetermined temperature, and
controlling timing of said switching step so that said member to be heated arrives at said predetermined temperature at said start timing of an image formation operation.

24. An image formation apparatus comprising:
a designation unit which provides designation to carry out an image formation operation;
a readout unit which initiates a readout operation of a document according to the designation of said designation unit;
a memory unit which stores image data output from said readout unit;
an image forming unit which carries out the image formation operation according to the image data stored in said memory unit;
a member to be heated for operating at a predetermined temperature;
a controller which obtains start timing of a first image formation operation based on the designation of said designation unit and controls the temperature of the member to be heated so as to arrive at said predetermined temperature at said start timing of the first image formation operation.

25. The image formation apparatus according to claim 24, wherein said member to be heated fixes an image onto a sheet.

26. The image formation apparatus according to claim 25, wherein said image forming unit forms an image using an electrophotographic method, and said member to be heated melts a toner image on the sheet to fix the toner image onto the same.

27. The image formation apparatus according to claim 24, wherein said member to be heated melts an adhesive to bind a plurality of sheets on which images are formed into one bundle.

28. An image formation apparatus comprising:
   a designation unit which provides designation to carry out an image formation operation;
   a readout unit which initiates a readout operation of a document according to the designation of said designation unit;
   a number inputting unit which inputs the number of documents to be read;
   a memory unit which stores image data output from said readout unit;
   an image forming unit which carries out the image formation operation according to the image data stored in said memory unit;
   a member to be heated for operating at a predetermined temperature;
   a controller which obtains start timing of a first image formation operation based on the number of documents to be read inputted by said number inputting unit and controls the temperature of the member to be heated so as to arrive at said predetermined temperature at said start timing of the first image formation operation.

29. The image formation apparatus according to claim 28, wherein said member to be heated fixes an image onto a sheet.

30. The image formation apparatus according to claim 29, wherein said image forming unit forms an image using an electrophotographic method, and said member to be heated melts a toner image on the sheet to fix the toner image onto the same.

31. The image formation apparatus according to claim 28, wherein said member to be heated melts an adhesive to bind a plurality of sheets on which images are formed into one bundle.

32. An image formation apparatus comprising:
   a designation unit which provides designation to carry out an image formation operation;
   a readout unit which initiates a readout operation of a document according to the designation of said designation unit;
   a memory unit which stores image data output from said readout unit;
   image forming unit which carries out the image formation operation according to the image data stored in said memory unit;
   a mode setting unit which sets one out of a plurality of image formation modes in which two or more image corresponding to documents different one another are formed on one sheet;
   a member to be heated for operating at a predetermined temperature;
   a controller which obtains start timing of a first image formation operation based on the image formation mode set by said mode setting unit and controls the temperature of the member to be heated so as to arrive at said predetermined temperature at said start timing of the first image formation operation.

33. The image formation apparatus according to claim 32, wherein said plurality of image forming modes include a mode in which two images corresponding to documents different from each other are formed on one sheet.

34. The image formation apparatus according to claim 33, wherein said member to be heated fixes an image onto a sheet.

35. The image formation apparatus according to claim 34, wherein said image forming unit forms an image using an electrophotographic method, and said member to be heated melts a toner image on the sheet to fix the toner image onto the same.

36. The image formation apparatus according to claim 32, wherein said plurality of image forming modes include a mode in which four image corresponding to documents different from one another are formed on one sheet.

37. The image formation apparatus according to claim 36, wherein said member to be heated fixes an image onto a sheet.

38. The image formation apparatus according to claim 37, wherein said image forming unit forms an image using an electrophotographic method, and said member to be heated melts a toner image on the sheet to fix the toner image onto the same.

39. The image formation apparatus according to claim 32, wherein said plurality of image forming modes include a mode in which book-binding in a collated folded-binding manner is provided when sequentially stacked sheets on which images are formed are bent into halves at the center portion and bound at the bent portion.

40. The image formation apparatus according to claim 39, wherein said member to be heated melts an adhesive to bind the stacked sheets.

41. An image forming method comprising the steps:
   designating to carry out an image formation operation;
   reading a document according to the designation;
   storing image data output from said reading step;
   carrying out image formation operation according to the image data stored in the storing step;
   heating a member to be heated for operating at a predetermined temperature;
   obtaining start timing of a first image formation operation based on the designation and controlling the temperature of the member to be heated so as to arrive at said predetermined temperature at said start timing of the first image formation.

42. The image forming method according to claim 41, wherein said member to be heated fixes an image onto a sheet.

43. The image forming method according to claim 42, wherein said step of carrying out the image formation operation includes a step of forming the image using an electrophotographic method, and said member to be heated melts a toner image on the sheet to fix the toner image onto the same.

44. The image forming method according to claim 41, wherein said member to be heated melts and adhesive to bind a plurality of sheets on which images are formed into one bundle.

45. An image forming method comprising the steps of:
   designating to carry out an image formation operation;
   initiating a readout operation of a document according to the designation;
   inputting the number of documents to be read in said readout operation;
   storing image data output from said readout operation;

carrying out the image formation operation according to the image data stored;

heating a member to be heated for operating at a predetermined temperature; and obtaining start timing of a first image formation operation based on the number of documents to be read and controlling the temperature of the member to be heated so as to arrive at said predetermined temperature at said start timing of the first image formation operation.

46. The image forming method according to claim 45, wherein said member to be heated fixes an image onto a sheet.

47. The image forming method according to claim 46, wherein said carrying out step includes the step of forming an image using an electrophotographic method, and said member to be heated melts a toner image on the sheet to fix the toner image onto the same.

48. The image forming method according to claim 45, wherein said member to be heated melts an adhesive to bind a plurality of sheets on which images are formed into one bundle.

49. An image forming method comprising the steps of:

designating to carry out an image formation operation;

initiating a readout operation of a document according to the designation step;

storing image data output from said initiating step;

carrying out the image formation operation according to the image data stored in said storing step;

setting one out of a plurality of image formation modes in which two or more images corresponding to documents different from one another are formed on one sheet;

heating a member to be heated for operating at a predetermined temperature; and obtaining start timing of a first image formation operation based on the image formation mode set in said mode setting step and controlling the temperature of the member to be heated so as to arrive at said predetermined temperature at said start timing of the first image formation operation.

50. The image forming method according to claim 49, wherein said plurality of image forming modes include a mode in which two images corresponding to documents different from each other are formed on one sheet.

51. The image forming method according to claim 50, wherein said member to be heated fixes an image onto a sheet.

52. The image forming method according to claim 51, wherein said step of carrying out image formation operation includes the step of forming an image using an electrophotographic method, and said member to be heated melts a toner image on the sheet to fix the toner image onto the same.

53. The image forming method according to claim 49, wherein said plurality of image forming modes include a mode in which four images corresponding to documents different from one after another are formed on one sheet.

54. The image forming method according claim 53, wherein said member to be heated fixes an image onto a sheet.

55. The image forming method according to claim 54, wherein said step of carrying out the image formation operation includes the step of forming an image using an electrophotographic method, and said member to be heated melts a toner image on the sheet to fix the toner image onto the same.

56. The image forming method according to claim 49, wherein said plurality of image forming modes include a mode in which book-binding in a collated folded-binding manner is provides where sequentially stacked sheet on which images are formed are bent into halves at the center portion and bound at the bent portion.

57. The image forming method according to claim 56, wherein said member to be heated melts an adhesive to bind the stacked sheet.

* * * * *